(12) United States Patent
McClintock et al.

(10) Patent No.: US 10,007,779 B1
(45) Date of Patent: Jun. 26, 2018

(54) METHODS AND SYSTEMS FOR GRADUAL EXPIRATION OF CREDENTIALS

(71) Applicant: Amazon Technologies, Inc., Seattle, WA (US)

(72) Inventors: Jon Arron McClintock, Seattle, WA (US); Yogesh Vilas Golwalkar, Hyderabad (IN); Bharath Kumar Bhimanaik, Bangalore (IN); Darin Keith McAdams, Seattle, WA (US); Tushaar Sethi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 32 days.

(21) Appl. No.: 14/869,185

(22) Filed: Sep. 29, 2015

(51) Int. Cl.
*G06F 21/45* (2013.01)
*G06F 21/31* (2013.01)

(52) U.S. Cl.
CPC ............ *G06F 21/45* (2013.01); *G06F 21/31* (2013.01)

(58) Field of Classification Search
CPC ............... G06F 21/31; G06F 21/6218; G06F 2221/2137; G06F 2221/2151; G06F 2221/2113; H04L 63/105; H04L 63/10; H04L 67/143; H04L 41/5003; G06Q 30/0225; G06Q 20/4016; H04W 12/06
See application file for complete search history.

(56) References Cited

U.S. PATENT DOCUMENTS

| | | | |
|---|---|---|---|
| 8,356,176 B2* | 1/2013 | Salomone | H04L 63/068 370/338 |
| 2003/0158949 A1 | 8/2003 | Miller et al. | |
| 2010/0122333 A1* | 5/2010 | Noe | H04L 63/0815 726/8 |
| 2011/0307941 A1* | 12/2011 | Dhanakshirur | H04L 63/105 726/4 |
| 2014/0297537 A1 | 10/2014 | Kassemi et al. | |
| 2016/0149891 A1 | 5/2016 | Kuper et al. | |
| 2017/0093897 A1* | 3/2017 | Cochin | G06F 17/30675 |

OTHER PUBLICATIONS

U.S. Appl. No. 14/869,344, filed Sep. 29, 2015, Titled: Methods and Systems for Enabling Access Control Based on Credential Properties.

* cited by examiner

*Primary Examiner* — Brian F Shaw
(74) *Attorney, Agent, or Firm* — Kilpatrick Townsend & Stockton LLP

(57) ABSTRACT

Methods and systems are provided to enable gradual expiration of credentials. Instead of depriving a user of all his access rights upon expiration of his credential (e.g., password), the user's access rights may be gradually restricted during a grace period after an expected or initial expiration time and/or before a final expiration time. The access right may be determined based on a duration from a time of the access request to the final expiration time or to the initial expiration time.

20 Claims, 11 Drawing Sheets

METHODS AND SYSTEMS FOR GRADUAL EXPIRATION OF CREDENTIALS

CROSS-REFERENCE TO RELATED APPLICATIONS

This application is also related to and incorporates by reference for all purposes the full disclosure of co-pending U.S. patent application Ser. No. 14/869,344, filed Sep. 29, 2015, entitled "METHODS AND SYSTEMS FOR ENABLING ACCESS CONTROL BASED ON CREDENTIAL PROPERTIES".

BACKGROUND

As a best security practice, organizations typically impose a rigid password expiration timeline, forcing users to periodically change their passwords (e.g., 90 days) or lose access to all resources. If a user changes her password to a new password before the expiration date, the new password will enable the user to continue accessing resources for another period of time (e.g., 90 days). If, on the other hand, the user does not change her password before the expiration date, the old password will expire and the user will lose all access to previously-accessible resources. In some cases, the user will then have to request password reset from an IT helpdesk. Such an all-or-nothing approach to password expiration can lead to bad user experience as well as administrative cost to handle password reset requests.

BRIEF DESCRIPTION OF THE DRAWINGS

Various embodiments in accordance with the present disclosure will be described with reference to the drawings, in which.

DETAILED DESCRIPTION

Figure 1:
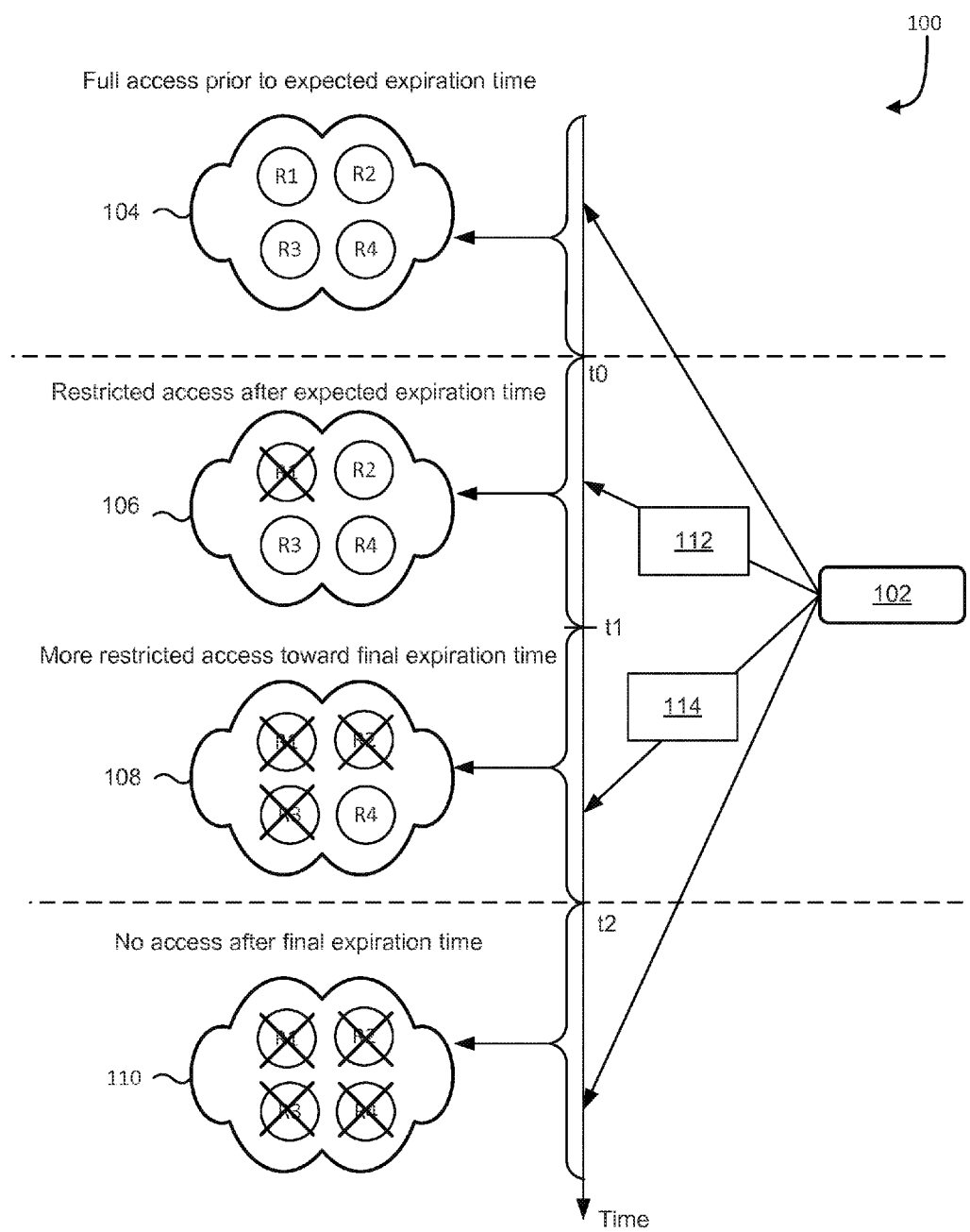
FIG. 1 illustrates an example timeline for gradual expiration of credentials, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Methods and systems are provided to enable gradual and/or virtual expiration of credentials. A credential (e.g., password, cryptographic key, digital certificate) may be expected to be changed periodically or at a certain frequency. The time interval between such expected credential changes may be referred to as the credential's maximum age. The maximum age may be fixed (e.g., 90 days) or varied, predefined or dynamically generated based on various factors, and/or associated with one or more credentials or credential sources (e.g., users, accounts).

The expected expiration time (also referred to as the initial expiration time) for the credential may be calculated by adding the maximum age of the credential and the update time for the credential. For example, if a credential is last updated at 14:30 on Jul. 20, 2015 and the maximum age for the credential is 90 days, then the expected or initial credential expiration time occurs at 14:30 on Oct. 18, 2015, or 90 days after the credential change. In various embodiments, the initial expiration time represents a "soft" deadline representing when a credential is expected to be changed. Such a deadline is soft because failure to change the credential before the initial expiration time does not result a complete loss of access to all the resources previously accessible before the initial expiration time. Rather, a grace period can be provided after the initial expiration time during which the access provided by the credential is progressively restricted instead of entirely eliminated. The restriction on access may become more severe as time goes on until the end of the grace period when access is completely cut off at an actual or final expiration time. If the credential is updated before the final expiration time, full access rights may be restored and the initial expiration time may be reset based on the time the credential is updated.

During the grace period, a credential source (e.g., user or account represented by the credential) is allowed to retain some but not all of the previously enjoyed privileges and/or access rights using the credential. For instance, the credential source may be allowed to access only a subset of the resources previously accessible using the credential before the initial expiration time. For example, a user may be allowed to access only certain subset of services, applications, and/or data. As another example, the credential source may be allowed to access the same resource(s) but at a lower access level. The lower level of access may include a certain type, duration, and/or scope of access that is more restrictive. For example, a user may be allowed to perform only read-only operations with respect to one or more data objects (e.g., stored in files, memory locations, etc.), as opposed to the previous read/write operations.

The access rights associated with the credential may become more restrictive as time goes on until the final expiration time. In some embodiments, the time period may be divided into a plurality of smaller time intervals (intermediate intervals), each ending at an intermediate expiration time. Each of these intermediate intervals may be associated with a set of rules that may be used to determine the access rights associated with the credential if the credential is used during the corresponding intermediate interval. The association between the intermediate expiration times and associated rule sets may be stored and retrievable in a map, table, or any other suitable data structure. For example, a grace period of 10 days may include three intermediate expiration times at three, six, and nine days after the initial expiration time, dividing the grace period into four intermediate intervals. A set of access rules may be associated with each of intermediate intervals to determine the access rights of the credential during the corresponding intermediate interval. The sets of access rules may become more restrictive as time progresses.

The access rules may be defined based on the time when access is requested, initial expiration time, and/or the final expiration time of the credential. For example, an access rule may be used to determine an access right with respect to one or more resources based on a period of time that has lapsed since the initial expiration time and/or a period of time till the final expiration time. Additionally or alternatively, the access rules may be defined based on one or more environmental factors associated with an environment of one or more resources, attributes associated with the credential, credential source, and/or access requests, business rules or policies, government or industry standards, user inputs and/ or preferences, and the like. In some embodiments, the length of the grace period, the lengths of the intermediate intervals, and/or the corresponding rule sets may also be determined based on one or more of the factors discussed herein.

Consider a first example. Alice has a password that she uses to access her work computer, various servers, and/or her email account. Alice forgot to change her password before the expected expiration time for her current password, July 10, because she was busy preparing for her vacation which started on July 11 and ends on July 18. She may request a grace period of 10 of days such that she can still change her password after returning from her vacation realizing that her access rights will be limited. For example, she may be able to still access her emails and/or her computer but not certain network servers or services. As another example, she may be able to access certain applications and/or storage locations on her computer while being denied others. The restriction on access rights may become more severe toward the end of the grace period. For example, immediately after the expected expiration time of July 10, Alice may be restricted to only being able to access a corporate website and check her emails, but not a production server. At day 5 after July 10, Alice may be allowed to perform only read-only operations on the corporate website as well as accessing her emails. After day 8, Alice may only be allowed to access her emails. And after the end of the 10 day grace period, Alice's password may be fully disabled.

Consider a second example. Ben may be a user of an online service such as an electronic marketplace or a social media website. The online service may require that Ben renew his password every 90 days. If Ben fails to change or update his password by the expected expiration time (e.g., 90 days from the last password change), he is not locked out of his account entirely. Instead, he may be given a grace period (e.g., 7 days) during which he can still log in using the old credential, but he may only be allowed to utilize a limited set of functionalities or services. For example, Ben may only be allowed to change his password once he logs in. As another example, he may only be allowed to read information on a website without the ability to create content. In some cases, loss of access rights may be gradual. For instance, he may be allowed to see other users' information (e.g., posts, listings) for the first two days after the expected expiration time, but only limited to see his own profile information after the first two days. After the end of the grace period, Ben will not be allowed to even log into his account. In such cases, the length of the grace period may be determined by policies of the online service and/or other information such as historical data related to user behavior, characteristics of the user account, and other environmental factors such as time and location of access.

Consider a third example. Caroline's password is expected to expire every 90 days from the last time she changes her password. At 83 days, she starts receiving password expiration warnings. At 90 days, she is no longer able to access sensitive data stores and systems. At 97 days, her desktops and laptops are quarantined such that she is restricted to be able to access only the password reset site. At 104 days, Caroline's password is finally disabled.

Advantageously, techniques disclosed herein can be used to enhance user satisfaction and reduce administrative cost associated with credential update. With limited access after the expected expiration of the password, the user will be able to change the password without resorting to IT help, thereby improving user experience and reducing administrative costs. Additionally, the gradual deprivation of access may cause gradually increasing inconvenience to the user, thereby prompting the user to change her password in a more gentle and user-friendly fashion than the traditional forced password change.

In some embodiments, a credential may include any information that allows a processor to identify, verify, or authenticate the identity of a source of the credential, and/or to identify any associated rights or privileges. A source of a credential may include an entity (e.g., user, account, device, system) with which the credential is associated with. Credentials can include passwords, personal identification number (PIN), username, cryptographic credentials, payment credentials, biometric credentials, multifactor authentication or authorization code or token, and the like. Cryptographic credentials can include cryptographic keys such as encryption keys, public keys, private keys, and the like. In some cases, a cryptographic key may include a master key that is used to retrieve, encrypt, decrypt, or derive other keys. Cryptographic credentials can also include digital certificates and digital signatures. Payment credentials can include any information that allows a processor to identify, verify, and/or process a payment transaction using a consumer account. Such a payment credential may include an account identifier (e.g., primary account number (PAN)), a token (e.g., account identifier substitute), card verification value (e.g., CVV, CVV2, dCVV, etc.), a dynamic cryptogram or dynamic value (e.g., dynamic authentication data), or any other relevant information. A credential can be self-issued. For example, a password can be issued and/or maintained by the source of the credential (e.g., user or account holder). A credential may also be issued by an entity that accepts the credential such as a service provider. A credential can also be issued, certified, or managed by a third-party entity. For example, a digital certificate can be issued by a certificate authority (CA). The third-party may be trusted by either or both the source (e.g., account holder) and target (e.g., service provider) of the credential.

A credential or a source of the credential may be associated with one or more credential-related attributes such as a time when the credential is last updated, an indicator of whether the credential has expired, a maximum age of credential, a number of time the credential has been changed, an encryption scheme for the credential, and the like. Cryptographic credentials may be associated with attributes such as those discussed in public-key cryptography standards (e.g., PKCS #9). In some cases, an expiration time for a credential may be directly associated with the credential as an attribute or derived based on attributes of the credential (e.g., by adding maximum age and a last update time).

In some embodiments, the credentials may be stored in a secure element of a client device (e.g., a smart card or security token, a mobile device). The secure element can include a secure memory that is configured such that the data stored in the secure memory may not be directly accessible by outside applications and only accessible by a secure application such as an electronic wallet application.

An initial expiration time of a credential represents a point in time beyond which access rights associated with a credential will start to be restricted. The initial expiration time typically represents a "soft" deadline by which the credential is expected to be changed. However, failure to change the credential by the initial expiration time does not result a complete loss of access rights to all the resources previously accessible before the initial expiration time. Rather, starting from the initial expiration time and for a period of time after initial expiration time, the access rights will become more restrictive according to various access rules and/or according to a predetermined expiration schedule until the final expiration time.

A final expiration time of a credential typically is a point in time that typically represents a "hard" deadline by which the credential must be changed, after the initial expiration time. In contrast to the initial expiration time, failure to change the credential by final expiration time does result a complete loss of access rights to all the resources previously accessible before the initial expiration time. The period of time between the initial expiration time and the final expiration time is the grace period.

An intermediate expiration time is a point in time in the grace period between an initial expiration time and a final expiration time. There may be zero, one, or more intermediate expiration times in a grace period. For example, if the initial expiration time is day 1 and the final expiration time is day 10, an intermediate expiration time can occur anytime in between. An intermediate expiration time is typically associated with a change in access rules or access rights associated with a credential. Thus, intermediate expiration times may divide the grace period into discrete time intervals with different access rights. In the example above, the user's access rights become restricted at or after the initial expiration time of day 1. A user may retain these restrictive access rights between day 1 and day 3. Day 3 may be a first intermediate expiration time, at or after which, the user's access rights may be further restricted, and so on.

A resource may include computing resources that are accessible via a computing device. Such computing resources can include data objects, computing devices or hardware/software components thereof (e.g., CPU, memory, applications), services (e.g., web services), virtual computer systems, data storage or management, network connections and interfaces, the like. For example, a resource can include one or more computing devices (e.g., desktop, laptop, tablet, mobile phone), files or other data stored in the computing devices, memory or data storage device associated with the computing devices, applications installed on the computer devices, peripheral devices associated with the computing devices such as input/output devices (e.g., keyboard, mouse, microphone, touchscreen, printer), network interfaces, services provided by the computing devices, and the like. Computing resources can include online or cloud-based services or functionalities provided by service providers. Computing resource can include one or more storage devices, nodes, systems, or a portion thereof such as a partition, a volume, a sector, and the like. Computing resources can also include data objects such as credentials (e.g., username, passwords, cryptographic keys, digital certifications). In this case, a master credential may be required to access these credentials. A resource can include tangible and/or intangible resources. Tangible resources can include devices, buildings, and physical objects. Intangible resources can include services and time, for example.

An access right with respect to a resource can indicate whether access is allowed or denied for the given resource. If access is allowed, an access right can also include information related to a type, duration, scope, and/or other aspects of the access to the resource. A type of access may refer to an operation that can be performed such as reading or writing data, receiving, processing, or sending information, launching or shutting down of devices, services, or applications, and the like. In some cases, certain types of access are more restrictive than others. For example, a read-only operation is considered more restrictive than a write operation. A duration of the access can indicate a period of time during which the access is allowed. Different types of access may have different durations. For instance, an access to a web page may have a shorter duration than an access to a virtual private network (VPN). In cases, persistent or long-running access may require renegotiation between the access requester and the access granter. A scope of access can depend on the type of resource and/or the type of access. A more restrictive access right may mean access with a narrower scope. For instance, a scope of access with respect to a data storage device can refer to a portion of the data storage that is made available for performing a type of operation. For example, the data storage may be partitioned into a plurality of portions, only some of which are available for read and write operations. Some other portions of the data storage may be available for read-only operation.

A first access right may be more restrictive than a second access right with respect to a given resource if the first access right denies access to the resource and the second access right allows access to the resource. Alternatively, a first access right may be more restrictive than a second access right if a type of access indicated by the first access right is more restrictive than a type of access indicated by the second access right; if a duration of access indicated by the first access right is shorter than a duration of access indicated by the second access right; and/or if a scope of access indicated by the first access right is more limited than a scope of access indicated by the second access right.

In some embodiments, the duration, and/or scope associated with the access rights determined according to the methods described herein are compatible with the gradual credential expiration time schedule discussed herein. For instance, if a user is allowed to run a VPN session up to Day 3 after the initial expiration of her credential and she requests a VPN session before Day 3, the access right she receives with respect to VPN session should indicate a duration that does not extend beyond Day 3. For example, if she requests VPN access on Day 1, the access right may indicate that a maximum duration of two days. On the other hand, if she requests VPN access on Day 2, the access right may indicate a maximum duration one day. Beyond the maximum duration, the user may be required to renegotiate the access rights. During renegotiation, the same or different access rules and/or policies (discussed below) may be used to determine updated access rights. For example, if renegotiation of the VPN access occurs before Day 3, then the same set of access rules that govern accesses before Day 3 may apply and used to grant a VPN access up to Day 3. On the other hand, if renegotiation of the VPN access occurs after Day 3, then a different set of access rules may apply and denies the VPN access all together.

An access rule may be used to determine one or more access rights. An access rule may apply to one or more entities requesting access such as users or accounts. An access rule may include a rule condition and a rule action. An access rule or the associated rule action is triggered when the corresponding rule condition is satisfied. The rule action may include one or more access rights. A first access rule may be considered more restrictive than a second access rule if at least one access right associated with the first access rule is more restrictive than at least one access right associated with the second access rule. A first set of access rules may be considered more restrictive than a second set of access rules if at least one access rule of the first set of access rules is more restrictive than at least one access rule of the second set of access rules.

In some embodiments, a set of one or more access rules may be associated with a grace period between an initial expiration time and a final expiration time. The set of access rules (or rule conditions) may be defined based at least in part on when an access request (e.g., an authentication request or an authorization request) is made relative to an initial expiration time, a final expiration time, and/or the grace period. For example, if the access request is made relatively soon after the initial expiration time (or relatively far from the final expiration time), then less restrictive access rights may apply than when the access request is made later on (or closer to the final expiration time). In some embodiments, a grace period may be divided into a plurality of intermediate intervals by one or more intermediate expiration times. In such embodiments, a set of one or more access rules may be associated with each of the intermediate intervals. The sets of access rules respectively associated with the intermediate intervals may become more restrictive the intermediate intervals get closer to the final expiration time.

FIG. 1 illustrates an example timeline 100 for gradual expiration of a credential, in accordance with embodiments. As illustrated, a credential 102 is expected to expire at an initial or expected expiration time t0. Prior to the initial expiration time t0, the credential 102 can be used to access a plurality of resources 104 comprising resources R1, R2, R3, and R4. If the credential 102 is not updated prior to the initial expiration time t0, a grace period is provided from the initial expiration time, t0, to a final expiration time, t2. During the grace period, access to the resources is restricted but not entire eliminated.

In some embodiments, such as illustrated in FIG. 1, the grace period can include one or more intermediate expiration times such as t1, thereby dividing the grace period into two or more intermediate intervals. The intermediate intervals may be inclusive or exclusive of the intermediate expiration time, initial expiration time, and/or final expiration time. Each of the two or more intermediate intervals may be associated with a different set of access rules 112, 114. Each set of rules, when applied to suitable factors on which the rules are defined, can result in different access rights to some or all of the plurality of resources 104. In general, access become more restrictive as time progresses toward the final expiration time. For example, in the first intermediate interval from t0 to t1, the credential 102 can only be used to access a subset 106 of the previously accessible plurality of resources 104, as a result of the application of the rule set 112 associated with the intermediate interval from t0 to t1. The subset of resources 106 include some (e.g., R2, R3, and R4) of the resources 104 while excluding others (e.g., R1, marked by an "x"). The accessible subset of resources is further reduced in the second intermediate interval from t1 to t2, during which the credential 102 can only be used to access a subset 108 of the subset 106 of resources, as a result of the application of the rule set 114 associated with the intermediate interval from t1 to t2. For instance, R2 and R3, which are accessible in the previous intermediate interval from t0 to t1, are no longer accessible during the intermediate interval from t1 to t2, while R4 remains accessible. Eventually, at or after the final or actual expiration time t2, the credential 102 can no longer be used to access any of the resources (as denoted by the empty set 110). In some other embodiments, instead of dividing up the grace period into two or more discrete time intervals, a set of access rules may be associated with the entire grace period and used to determine access rights associated with the credential at various points within the grace period.

Figure 2:
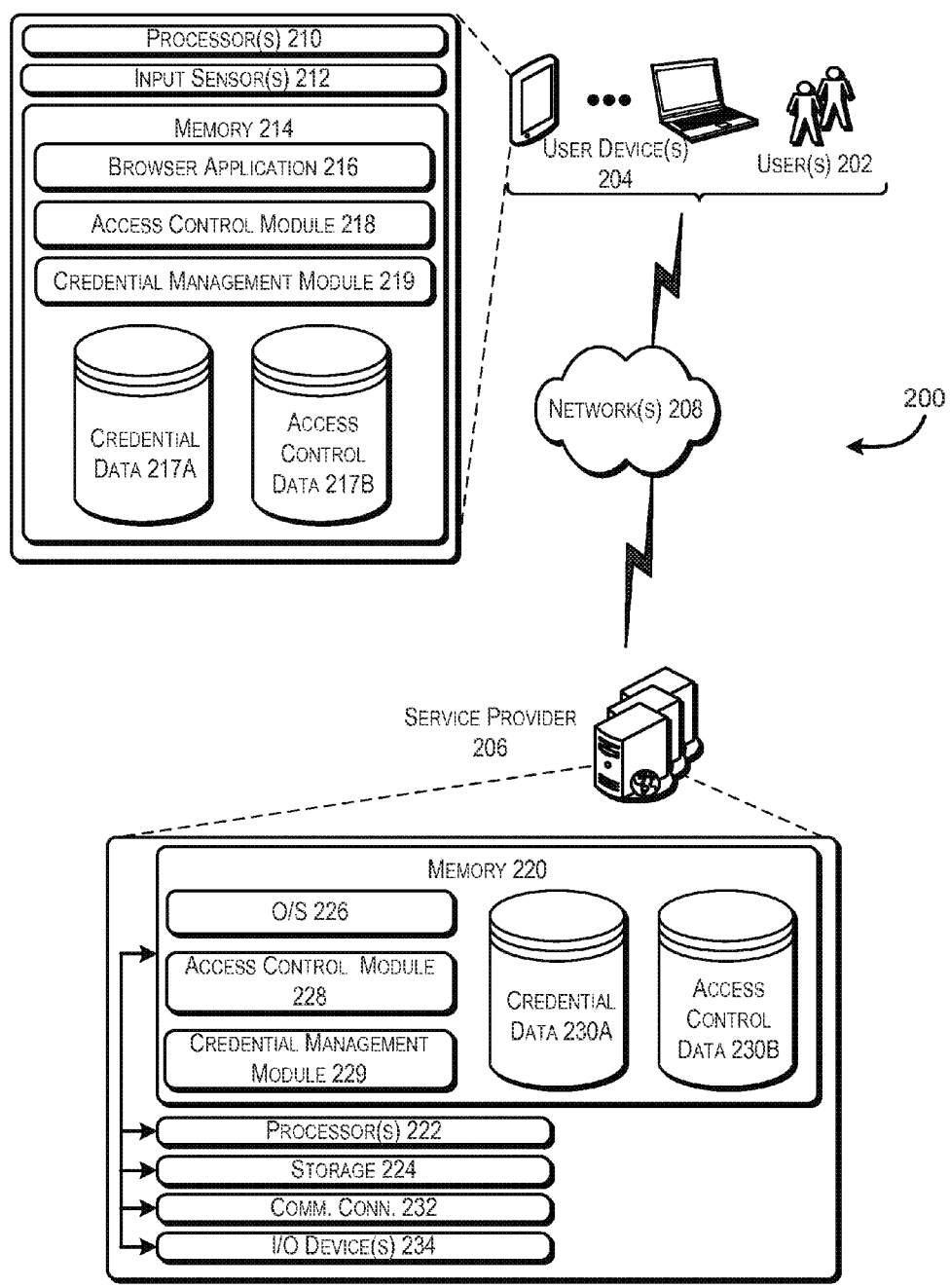
FIG. 2 illustrates an exemplary system or architecture in which techniques for gradual credential expiration may be implemented.

FIG. 2 illustrates an exemplary system or architecture 200 in which techniques for gradual credential expiration may be implemented. In architecture 200, one or more consumers and/or users 202 may utilize user devices 204. In some examples, the user devices 204 may be in communication with a service provider 206 via the network(s) 208, or via other network connections.

The user devices 204 may be any type of computing device such as, but not limited to, a mobile phone, a smart phone, a personal digital assistant (PDA), a laptop computer, a desktop computer, a server computer, a thin-client device, a tablet PC, etc. Additionally, user devices 204 may be any type of wearable technology device, such as a watch, earpiece, glasses, etc. The user device 204 may include one or more processors 210 capable of processing user input. The user device 204 may also include one or more input sensors 212 for receiving user input. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Embodiments of the application on the user device 204 may be stored and executed from its memory 214.

Turning to the contents of the memory 214 in more detail, the memory 214 may include a browser application 216. The memory 214 may also include an access control module 218 and a credential management module 219. The access control module 218 may be configured to control access to a plurality of resources according to the techniques disclosed herein. The credential management module 219 may be configured to store, retrieve, update, or otherwise manage credential associated with the user device 204. Although sample architecture 200 depicts an access control module 218 and a credential management module 219 as being included in the contents of the memory 214 of the user device 204, some embodiments may not include an access control module 218 or a credential management module 219 in memory 214 of the user device 204. In those embodiments, the functionalities of the access control module 218 and/or the credential management module 219 may instead be provided by the service provider 206, as described in further details below.

In some embodiments, the credential management module 218 may be configured to provide storage, retrieval, and/or update of credentials associated with the user 202 and/or user device 204 in conjunction with a credential data store 217A. For instance, the credential management module 219 may be configured to store, in the credential data store 217A, credentials used by the user 202 to access various resources discussed herein. For instance, the credential data store 217A may be used to store usernames, passwords, cryptographic keys, digital certificates, and the like. In some embodiments, the credential management module 219 may be configured to encrypt, decrypt, or otherwise transform the credential data. Based on the stored credential data, the credential management module 219 can be configured to authenticate a user by verifying that received credential data is indeed associated with the user. Such authentication may be performed, for example, by comparing the received credential data with credential data retrieved from the credential data store 217A. The credential management module 219 may be further configured to determine whether a credential has expired based on credential attribute data stored in the credential data store 217A.

The credential management module 219 may also be configured to update the stored credential data. For example, when a credential is updated, the credential management module 219 may be configured to update various attributes associated with the credential including, for example, a timing attribute such as a last update time and/or an expiration time. In some embodiments, additional attributes may be updated such as a final expiration time, a grace period, one or more intermediate expiration times, and the like. The credential management module 219 may also be configured to revoke or invalidate a credential (such as by setting an "expired" attribute of a credential or an equivalent thereof). In some embodiments, the credential management module 219 may be configured to invalidate a credential when it determines that the credential has expired, for example, by comparing a current time with an initial expiration time or a final expiration time of the credential. The initial expiration time of the credential may be determined, in an example, by summing the last update time and the maximum age of the credential. In another example, the initial expiration time of a credential may be included as an attribute of the credential. The final expiration time of the credential may be determined, in an example, by summing the initial expiration time and a grace period for the credential. In another example, the final expiration time of a credential may be included as an attribute of the credential. In some other embodiments, the credential management module 219 may be configured to invalidate a credential in response to a signal or message from an external source (e.g., a service provider). For example, under a push model, credentials may be centrally managed by a credential server with cached copies of the credentials stored by credential management modules of user devices. The credential server may be configured to send out periodic messages to the user devices informing the user devices to invalidate or otherwise update certain credentials. In such embodiments, the credential management module 219 may be configured to receive such credential update messages and manage the credential data accordingly.

In some embodiments, the access control module 218 may be configured to provide authentication and/or authorization functionalities including those related to the gradual expiration of credentials such as described herein. For example, the access control module 218 may be configured to receive a credential (for example, from the credential management module 219) and determine the access rights associated with the credential. If the credential has expired relative to an initial expiration time, the access control module 218 may be configured to determine whether to allow restricted access based at least in part on the initial expiration time of the credential. If the access request occurs within the grace period from the initial expiration time, then restricted access may still be provided. Otherwise, the credential may be determined to be completely invalid for any resources. Additionally or alternatively, the decision of whether to provide limited access may be based at least in part on a final expiration time. If the access request time is beyond the final expiration time, then no access is provided. Otherwise, if the access request time is between the initial expiration time and the final expiration time, then limited access may be available.

In some embodiments, the access control module 218 may be configured to gradual restrict access rights during the grace period according to one or more access control rules (also referred to as access rules) stored in an access control data store 217B. The access rules may include data that maps credential data to corresponding access rights and/or access rights used to determine access rights. The access rules may be defined based at least in part on a duration between an access request time (or any other suitable time) and an initial expiration time or a final expiration time. Additionally or alternatively, the access rules may be based on other factors such as business rules or organization policies, industry standards, properties of the credentials or credential sources, characteristics of the resources, historical user data (e.g., behavioral data, preference data, access patterns), other environmental factors or context data (e.g., whether a security compromise has occurred or been detected), and the like.

While FIG. 2 depicts the access control module 218 and the credential management module 219 as two separate modules, it is understood that in some embodiments, their functionalities may be implemented by one single module or more than two separate modules. In some embodiments, the user device 204 may include only one of or neither of the access control module 218 and the credential management module 219, in this case, the missing functionalities may be implemented by another entity (e.g., a service provider computer). In some embodiments, the access control module 218 may be configured to perform a pre-authorization check (pre-check) that occurs before an authorization check at the service provider 206 (e.g., by the access control module 228, discussed below).

The user device 204 may be configured to access one or more data stores including the containing credential data store 217A, the access control data store 217B, or any other data store suitable for storing data used to implement the features described herein. The credential data store 217A and/or access control data store 217B may be part of the memory 214 of the user device 204 (as illustrated). Additionally or alternatively, the credential data store 217A and/or access control data store 217B may be part of a data storage device operably connected to the user device 204 via a local or remote network.

In some examples, the network(s) 208 may include any one or a combination of many different types of networks, such as cable networks, the Internet, wireless networks, cellular networks, and other private and/or public networks. While the illustrated example represents the users 202 accessing the browser application 216 over the network(s) 208, the described techniques may equally apply in instances where the users 202 interact with a service provider 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 216 may allow the users 202 to interact with a service provider 206, such as to store, access, and/or manage data, develop and/or deploy computer applications, and/or host web content. The one or more service provider(s) 206, perhaps arranged in a cluster of servers or as a server farm, may host the browser application 216. These servers may be configured to host a website (or combination of websites) viewable via the user device 204 or a web browser accessible by a user 202. Other server architectures may also be used to host the browser application 216. The browser application 216 may be capable of handling requests from many users 202 and serving, in response, various user interfaces that can be rendered at the user device 204 such as, but not limited to, a web site. The browser application 216 can be configured to access any type of website that supports user interaction, including social networking sites, electronic retailers, informational sites, blog sites, search engine sites, news and entertainment sites, and so forth.

In some embodiments, the browser application 216 can be used to send requests to access resources and/or to receive responses regarding access to resources. Such access requests may include credentials. For example, the browser application 216 can be configured to receive credentials (e.g., login password to a website or online service, cryptographic keys, digital certificates) from the user or another process or application and transmit the credentials in a request to access one or more resources offered by a service provider 206.

In some embodiments, the server provider 206 may be configured to provide, for one or more user devices 204, access to one or more resources provided by the service provider 206. To this end, the service provider 206 may be configured to receive access requests from one or more user devices 204 to access resources provided by the service provider 206, process the access requests to determine access rights associated associate the access requests, and allow or deny access to the requested resources according to the access rights.

The service provider 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 206 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In some embodiments, the service provider 206 can be configured to authenticate and/or authorize access to one or more resources. In some implementations, the authentication and/or authorization may be performed directly by a resource server of the one or more resources. The service provider may be the resource provider. In some other implementations, the authentication and/or authorization may be performed by a proxy server that is operably connected to a resource server. The proxy server may be operated by the resource provider. Alternatively, the proxy server may be operated by a third-party service provider that is different from the resource provider.

In one illustrative configuration, the service provider 206 may include at least one memory 220 and one or more processing units (or processor(s)) 222. The processor(s) 222 may be implemented as appropriate in hardware, computer-executable instructions, firmware or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 222, as well as data generated during the execution of these programs. Depending on the configuration and type of service provider 206, the memory 220 may be volatile (such as random access memory (RAM)) and/or non-volatile (such as read-only memory (ROM), flash memory, etc.). The service provider 206 may also include additional storage 224, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM.

Turning to the contents of the memory 220 in more detail, the memory 220 may include an operating system 226, a database containing access control data 230 and the one or more application programs or services for implementing the features disclosed herein, including a access control module 228 and a credential management module 229. The credential management module 229 may be configured to store, retrieve, update, or otherwise manage credential data for one or more users of the service provider 206 in conjunction with a credential data store 230A, similar to the credential management module 219 discussed above. For instance, the credential management module 229 may be configured store, in the credential data store 230A, credentials used by various users 202 to access various resources discussed herein such as usernames, passwords, cryptographic keys, digital certificates, and the like. The access control data store 230B may be configured to store data representing the mappings between credentials and access rules and/or access rights associated with the credentials. In some embodiments, the credential management module 229 may be configured to encrypt, decrypt, or otherwise transform the credential data. Based on the stored credential data, the credential management module 229 can be configured to determine a validity of a credential received from a user device 204, for example, by comparing the received credential data with credential data retrieved from the credential data store 230A. The credential management module 229 may be further configured to determine whether a credential has expired based on credential attribute data stored in the credential data store 230A.

The credential management module 229 may also be configured to update the stored credential data. For example, when a credential is updated, the credential management module 229 may be configured to update various attributes associated with the credential including, for example, timing attributes such as last update time and/or an expiration time. The credential management module 229 may also be configured to revoke or invalidate a credential (such as by setting an "expired" attribute of a credential or an equivalent thereof). In some embodiments, the credential management module 229 may be configured to invalidate a credential when it determines that the credential has expired, for example, by comparing a current time with an expiration time of the credential. The expiration time of the credential may be determined, in an example, by summing the last update time and the maximum age of the credential. In another example, the expiration time of a credential may be included as an attribute of the credential. In some other embodiments, the credential management module 229 may be configured to invalidate a credential in response to a signal or message from an external source (e.g., a user device 204, a certificate authority). In some other embodiments, credentials may be centrally managed by a credential server with cached copies of the credentials stored by credential management modules of user devices. The credential server (with credential management module 229) may be configured to send out periodic messages to the user devices informing the user devices to invalidate or otherwise update certain credentials.

In some embodiments, the access control module 228 may be configured to provide authentication and/or authorization functionalities including those related to the gradual expiration of credentials such as described herein. For example, the access control module 228 may be configured to receive a credential (for example, from the credential management module 229 or a user device 204) and determine the access rights associated with the credential. If the credential has expired (e.g., as determined by the credential management module 229), the access control module 229 may be configured to determine whether to allow restricted access to resources despite of the expiration of the credential, and if so, the restricted access rights that will be allowed. The access control module 228 may be configured to determine whether to provide limited access beyond the expiration time of a credential based at least in part on the initial expiration time. If the lapsed time period since the initial expiration time is within a predetermined grace period (e.g., 10 days), then restricted access may still be provided. Otherwise, the access control module 228 may be configured to deny access to all resources. In an alternative embodiment, the decision of whether to provide limited access may be based at least in part on a final expiration time associated with the credential. If the current time is beyond the final expiration time, then no access is provided. Otherwise, if the current time is between the initial expiration time and the final expiration time, then limited access may be available.

In some embodiments, the access control module 228 may be configured to gradually restrict access rights during the grace period according to one or more access control rules (also referred to as access rules) stored in an access control data store 230B. The credentials may be mapped to the corresponding access rules and/or access rights in a map, a table, or other data structures. The access rules may be similar to those discussed above for the access control data store 217B. Additionally or alternatively, the access rules may include information uniquely available to the service provider 206. Such information may include information about the current state of resources (e.g., workload), analysis results of aggregated user behavioral data (e.g., based on data across multiple users or accounts).

Although the access control module 228, credential management module 229, credential data store 230A, and access control data stores 230B are depicted in FIG. 2 as being implemented in the memory 220 of the service provider 206, it is envisioned that any of these modules could also be implemented by the user device 204 (such as by access control module 218, credential management module 219, credential data store 217A, and access control data store 217B). In some embodiments, a portion of the functionalities of these modules may be performed at either the service provider 206 and/or the user device 204. It is intended that this disclosure encompass any combination of these implementations.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the service provider 206. The service provider 206 may also contain communications connection(s) 232 that allow the service provider 206 to communicate with a stored database, another computing device or server, user terminals, and/or other devices on the network(s) 208. The service provider 206 may also include input/output (I/O) device(s) and/or ports 234, such as for enabling connection with a keyboard, a mouse, a pen, a voice input device, a touch input device, a display, speakers, a printer, etc.

Figure 3:
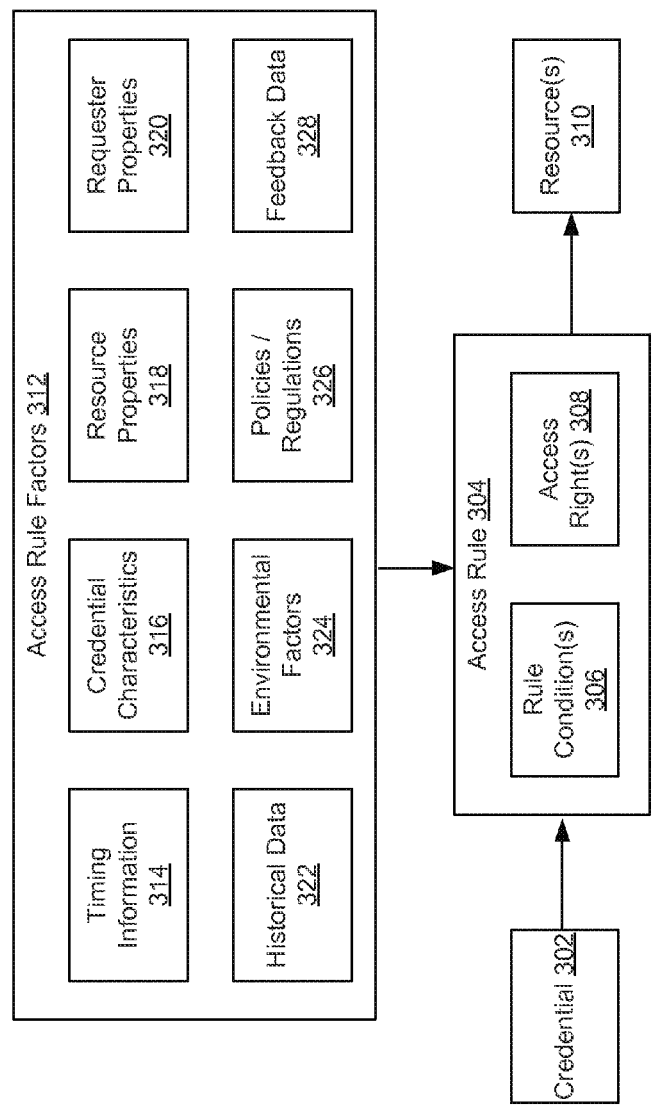
FIG. 3 illustrates an example access rule and example rule factors, in accordance with embodiments.

FIG. 3 illustrates an example access rule 304 and example rule factors 312, in accordance with embodiments. The access rule 304 may be used to determine one or more access rights 308 with respect to one or more resources 310 for a given credential 302. In some embodiments, a mapping between a credential 302 and one or more access rules 304 can be stored, for example, in an access control data store 217B or 230B discussed in FIG. 2. An access rule 304 may include one or more conditions 306 and one or more access rights 308. In some embodiments, the access rule 304 may not include any rule conditions. The access rule conditions 306 may be used to determine when the corresponding access rule 304 is triggered and thus when the access rights 308 apply. The access rule conditions 306 can be based on any one or any combination of a variety of access rule factors 312 including timing information 314, credential characteristics 316, resource properties 318, requestor properties 320, historical data 322, environmental factors 324, policies or regulations 326, and feedback data. It is understood that the illustrated access rule factors 312 are not intended to be limiting. In various embodiments, more or less factors than those listed may be used to determine access rights. Data for some or all of the factors discussed herein may be made accessible to the server provider 206, the user device 204, or both, from the memory 214 of the user device, the memory 220 of the service provider, and/or any other suitable data source.

In some embodiments, the access rules 304 may be generated by an automated rule generation engine. The rule generation engine may be configured to receive data for one or more access rule factors 312 discussed herein and generate corresponding access rules. Such a rule generation engine may be implemented by a service provider, a user device, or a third party entity. In some other embodiments, the access rules 304 may be generated by semi-automated process or by a human user (e.g., system administrator).

Figure 4:
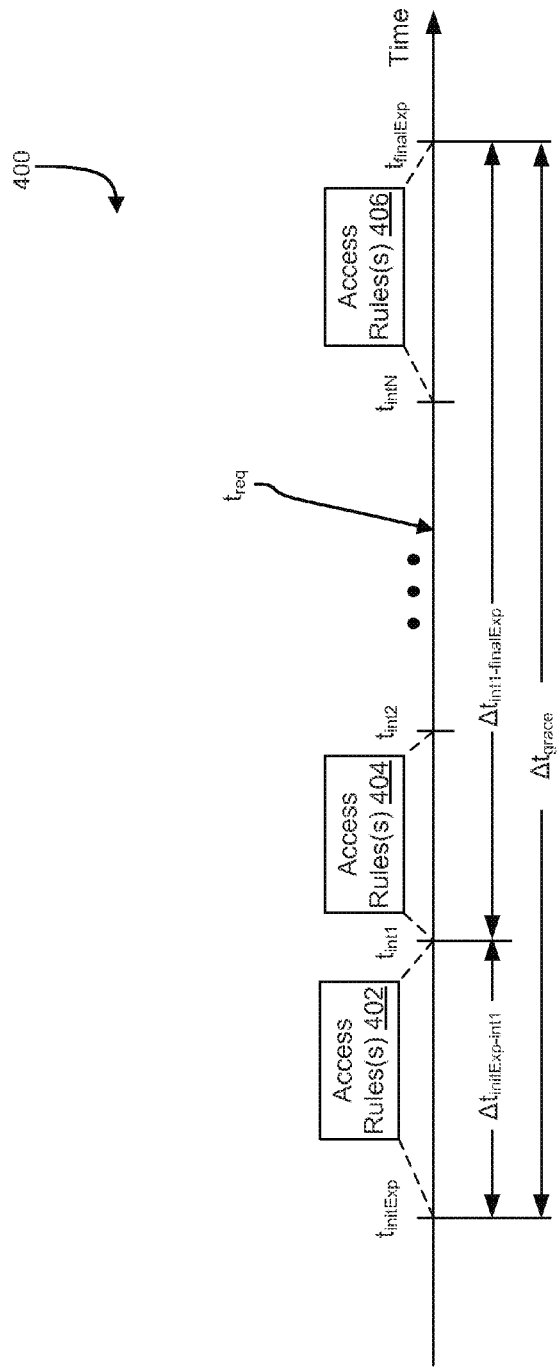
FIG. 4 illustrates an example timeline for gradual expiration of credentials, in accordance with embodiments.

In some embodiments, the rule conditions and/or access rules may be specified based on timing information 314. FIG. 4 illustrates an example timeline 400 with such timing information, in accordance with embodiments. As illustrated, the timing information may include a time when a request to access the resource is made, received, or processed (the access request time), $t_{req}$. Such access request time can be obtained from an access request, for example. The timing information can include an initial expiration time $t_{initExp}$ associated with the credential. The initial expiration time may be obtained directly (e.g., from an attribute of the credential) or calculated based on other data such as a last update time and a maximum age attribute of the credential. The timing information can also include a value for a grace period (e.g., 3 days, 5 days, 10 days), $\Delta t_{grace}$, and/or a final expiration time $t_{finalExp}$. Additionally or alternatively, the timing information one or more intermediate expiration times $t_{int1}, t_{int2}, \ldots t_{intN}$ between the initial expiration time and the final expiration time, intermediate durations, and/or intermediate intervals. An intermediate duration can refer to a duration between an intermediate expiration time and the initial expiration time (e.g., $\Delta t_{initExp-int1}, \Delta t_{initExp-int2}, \ldots, \Delta t_{initExp-intN}$), or a duration between intermediate expiration time and the final expiration time (e.g., $\Delta t_{int1-finalExp}, \Delta t_{int2-finalExp}, \ldots, \Delta t_{intN-finalExp}$). On the other hand, an intermediate interval refers to an interval between adjacent expiration times such as between $t_{initExp}$ and $t_{int1}$ ($\Delta t_{initExp-int1}$), between $t_{int1}$ and $t_{int2}$ ($\Delta t_{int1-int2}$), . . . , and between $t_{intN}$ and $t_{finalExp}$ ($\Delta t_{intN-finalExp}$).

In some embodiments, a rule condition and/or access rule can be specified based at least in part on the initial expiration time, the final expiration time, and/or the access request time. For example, a rule condition that is triggered when the access request time to fall within the grace period may be expressed as:

$$t_{initExp} < t_{req} < t_{finalExp}$$

Alternatively, the rule condition can be expressed based at least in part on a time period that has lapsed between the access request time and the initial expiration time ($t_{access} - t_{initExp}$):

$$(t_{access} > t_{initExp}) \text{ AND } (t_{access} - t_{initExp} < \Delta t_{grace})$$

Alternatively, the rule condition can be specified based at least in part on a duration from the access request time till the final expiration time ($t_{finalExp} - t_{access}$):

$$(t_{access} < t_{finalExp}) \text{ AND } (t_{finalExp} - t_{access} < \Delta t_{grace})$$

Additionally or alternatively, a rule condition and/or access rule may be specified based one or more intermediate expiration times $t_{int1}, t_{int2}, \ldots t_{intN}$, the intermediate intervals and/or the intermediate time durations. For example, a rule condition that is triggered when the access request time occurs in the first intermediate interval between $t_{initExp}$ and $t_{int1}$ can be expressed as:

$$t_{initExp} < t_{req} < t_{int1}$$

or, $$(t_{access} > t_{initExp}) \text{ AND } (t_{access} - t_{int1} > \Delta t_{initExp-int1})$$

or, $$\Delta t_{int1-finalExp} < t_{finalExp} - t_{access} < \Delta t_{grace}$$

In some embodiments, one or more sets of access rules 402, 404, 406 may be specified such that each set of access rules is applicable to access requests falling in a corresponding intermediate intervals. Such rule sets can be associated with intermediate intervals. For example, as illustrated in FIG. 4, the set 402 of access rules is associated with intermediate interval $\Delta t_{initExp-int1}$, the set 404 of access rules is associated with intermediate interval $\Delta t_{int1-int2}$, the set 406 of access rules is associated with intermediate interval $\Delta t_{intN-finalExp}$.

Alternatively or additionally, such rule sets may be associated with corresponding intermediate durations (relative to the initial expiration time or to the final expiration time), such that a rule set is applicable to requests occurring within the last intermediate interval included by the corresponding intermediate duration relative to the initial expiration time (e.g., as shown in the first example below) or within the first intermediate interval included by the corresponding intermediate duration relative to the final expiration time (e.g., as show in the second example below). For example, the set 402 of access rules can be associated with the intermediate duration relative to the initial expiration duration, $\Delta t_{initExp-int1}$, the set 404 of access rules can be associated with the intermediate duration relative to the initial expiration duration, $\Delta t_{initExp-int2}, \ldots$, and the set 406 of access rules can be associated with the intermediate interval relative to the initial expiration duration, $\Delta t_{initExp-intN}$. As another example, the set 402 of access rules can be associated with the intermediate duration relative to the final expiration duration, $\Delta t_{int1-finalExp}$, the set 404 of access rules can be associated with the intermediate duration relative to the final expiration duration, $\Delta t_{int2-finalExp}, \ldots$, and the set 406 of access rules is associated with the intermediate interval relative to the final expiration duration, $\Delta t_{intN-finalExp}$.

Alternatively or additionally, such rule sets may be associated with corresponding intermediate times points (times), the initial expiration time, and/or the final expiration time, such that a rule set is applicable to requests occurring within the intermediate interval before the associated time point (e.g., as shown in the first example below) or after (e.g., as shown in the second example below). For example, in an embodiment, the set 402 of access rules is associated with intermediate time $t_{int1}$, the set 404 of access rules is associated with intermediate time $t_{int2}, \ldots$, and the set 406 of access rules is associated with final expiration time $t_{finalExp}$. In an alternative embodiment, the set 402 of access rules is associated with initial expiration time $t_{initExp}$, the set 404 of access rules is associated with intermediate time $t_{int1}, \ldots$, and the set 406 of access rules is associated with intermediate time expiration time $t_{intN}$.

In some embodiments, the type, duration, and/or scope associated with the access rights determined according to the methods described herein are compatible with the gradual credential expiration time schedule discussed herein. For instance, if a user is allowed to run a VPN session up to Day 3 after the initial expiration of her credential and she requests a VPN session before Day 3, the access right she receives with respect to VPN session should indicate a duration that does not extend beyond Day 3. For example, if she requests VPN access on Day 1, the access right may indicate that a maximum duration of two days. On the other hand, if she requests VPN access on Day 2, the access right may indicate a maximum duration one day. Beyond the maximum duration, the user may be required to renegotiate the access rights. During renegotiation, the same or different access rules and/or policies (discussed below) may be used to determine updated access rights. For example, if renegotiation of the VPN access occurs before Day 3, then the same set of access rules that govern accesses before Day 3 may apply and used to grant a VPN access up to Day 3. On the other hand, if renegotiation of the VPN access occurs after Day 3, then a different set of access rules may apply and denies the VPN access all together.

Referring back to FIG. 3, in some embodiments, the rule conditions and/or access rules may be specified. additionally or alternatively, based on factors other than the timing information 314. For instance, the rule conditions and/or access rules may be specified based at least in part on one or more credential characteristics 316 of the credential 302 used to access the resources 310. In some embodiments, credential characteristics 316 can include one or more characteristics of the credential that are indicative or can be used to derive a strength of the credential. Such characteristics can include, for example, a length or size of and/or complexity of credential. Alternatively or additionally, the strength of a credential may be measured based on the complexity of an algorithm (e.g., cryptographic algorithm) used to generate the credential (e.g., cryptographic key). In some embodiments, an access rule may specify such that the stronger a credential, the less restrictive the access rights are associated with access rule because it is less likely that a strong credential will be compromised.

Additionally or alternatively, the rule conditions and/or access rules may be specified based at least in part on resource properties 318 associated with the resource(s) 310 to which access is sought. The resource properties 318 of a resource may include a type of the resource such as computing device, storage device, data object, service, application, and the like, or a portion thereof. The resource properties may be related to hardware and/or software configuration of the resource such as CPU, operating system, memory, network connectivity, storage capacity, and the like. In an example, more and/or longer access may be granted to a resource (e.g., computing device) configured with a relatively higher level of software/hardware protection against intrusion (e.g., operating system with less security holes, anti-virus software, firewall, biometric reader). The resource properties may also include a state or condition of various components of a resource such as physical wear and tear, number of years in operation, a utilization ratio, workload, and the like. In an example, more access may be provided to a resource with a better overall condition because the resource is better equipped to hand more access. Alternatively, less access may be provided to a resource with a better condition to prevent damage. In another example, a user may be provided more restrictive access rights (e.g., shorter duration, less privilege) to a resource that is heavily used, whereas the user may be given more relaxed access to a resource that is lightly used.

The resource properties may also include a level of security or perceived importance associated with the resource. In some cases, more restrictive access rights may be granted for resources deemed more important and/or sensitive. For example, a mission-critical payment processor computer that handles payment transactions may be associated with more restrictive access rights than a regular web server. A data storage device used to store highly sensitive data (e.g., financial data, health information) may be restricted to be accessible by fewer people and/or by people with fewer access rights (e.g., read-only rather than read/write access) than for a data storage device used to store less sensitive content of a music sharing website. As another example, an application used to access sensitive or confidential information (e.g., a banking application) may be associated with more restrictive access rights than an application used to browse the web.

Additionally or alternatively, the rule conditions and/or access rules may be specified based at least in part on requestor properties 320 associated with a requester of resources. Such requestor properties may include, for example, a position, a job role, a clearance level, a membership status or payment status, a classification, and the like, of a user, account, or other source of the credential. For instance, a user with a non-premium (e.g., free) account with a service provider may be provided with a more limited set of access rights with respect to a service offered by the service provider than another user with a premium (e.g., paid) account. A delinquent account may be provided less access than an account paid in full. A manager or a system administrator may be allowed more access to resources than a regular employee. A junior account associated with a computing device or an application may have less access than an adult account. In some embodiments, requestor properties can also include settings related to credentials such as credential update frequencies, a time when a credential is last updated, and the like.

Additionally or alternatively, the rule conditions and/or access rules may be specified based at least in part on historical data 322. Such historical data can include historical access data such as an entity, time, location, duration, type, scope, frequency associated with previous access by one or more entities to one or more resources. In an example, less access rights may be given to a resource that is frequently accessed by many users so as to reduce the impact of potential security breach. In an example, a user that routinely accesses one resource may be given more access rights with respect to the resource than a user that seldom access the resource. In another example, a user may be given access rights with a scope similar to what he is used to, based his past access patterns. For instance, if a user routinely accessed only certain types of applications or data, he may be given access rights with a scope that encompasses only those applications or data. In some embodiments, historical data can also include user behavioral data collected from various sources (e.g., input devices, sensors) and use such user behavioral data to determine a user's access rights. For instance, if a user has a track record of abusing system resources and/or causing security breaches, the access rights of the user may be more restrictive than other uses. The historical data 322 can also include resource performance or utilization data such that less access rights may be given to resources with poor past performance.

In various embodiments, the historical data used to determine access rights can include data for one entity (e.g., a user or account, a resource) or aggregated data across multiple entities. Further, the historical data can also include results of analysis performed on historical data such as rules and/or patterns of access and user behaviors. In some cases, deviations from such rules and/or patterns may cause changes to access rights (e.g., more or less restrictive). In various embodiments, analysis of historical data may be performed by any suitable entity (e.g., a service provider 206 or a user device 204 discussed in FIG. 2, or a third-party auditing entity) using any data analysis techniques such as statistical analysis, data mining, pattern recognition, machine learning, and the like. For example, an automated or semi-automated process running by a service provider may be configured to receive historical data related to access and process such data to determine occurrences or risks of security breaches.

Additionally or alternatively, the rule conditions and/or access rules may be specified based at least in part on environmental factors 324 related to an external environment. The external environment can encompass the physical or virtual environment of a service provider, a user device, a resource, or any other entities. The environmental factors can include a condition indicating a relatively security of the environment. For example, such external factors can include data related to actual or potential security breaches. More restrictive access rights may be granted if there has been recent a security breach at or near the resource to be accessed, or if the risk of such a security breach is high. As another example, the external factors can include a current location of the entity attempting to gain access to a resource. Thus, if a user is located at a public place, such as an airport, he may be associated with a higher risk of compromise and therefore granted a more restrictive set of access rights than if he is at a private or semi-private place, such as at home or office. As another example, the external factors can include a time of the attempted access to a resource. More or less access rights may be granted depending on when the access request is made. For instance, more access may be provided at night (when access to resources may be light) than during the day (when many people may compete for access) so as to improve overall system performance and/or user experience. Other environment factors may include an indication of a condition of a network condition such as related to connectivity, security, congestion, reliability, and the like. More or less restrictive access rights (e.g., shorter duration of access) may be provided based on the network condition.

Additionally or alternatively, the rule conditions and/or access rules may be specified based at least in part on any suitable policies and regulations 326. Such policies and regulations 326 may include business rules, government laws and regulations, industry standards, and the like. Such policies and regulations may be pertinent to the data security, confidentiality, credential expiration, and other aspects of access. For example, an industry standard may impose limits on a duration and/or scope of access to certain types of data (e.g., health care data, financial data). As another example, compliance with certain security regulations may require a limit on the maximum age of a credential. As yet another example, an organization or business may have its own internal rules that govern credential management and/or access control.

Additionally or alternatively, the rule conditions of access rules may be specified based at least in part on feedback data 328. The feedback data 328 may show a direct or indirect result of an application of the access rules. In some cases, feedback data 328 may include statistics related to an effect of the gradual credential expiration scheme such as discussed herein. Feedback data may also include user input such as comments or survey results, a number of credential reset requests handled by an IT department, an average time between credential updates for one or more users, and the like. For example, a user who is about to go on a leave around the initial expiration time of his credential may indicate the types of access that he hopes to retain during the grace period (e.g., access to email) and/or the length of grace period.

In some embodiments, some of the timing information 314 discussed above including the length of the initial expiration time, final expiration time, grace period, the number and/or spacing of various intermediate expiration times may be determined based at least in part on one or more of the other access rule factors 312 discussed above. The timing information 314 may be determined based at least in part on credential characteristics 316. For example, the grace period may be determined based at least in part on a strength of a credential. The stronger the credential is, the less risk there is of a credential compromise, and therefore the longer the grace period may be; and vice versa. As another example, the gradual deprivation of access rights may be more abrupt for a weak credential to prompt the user to change credential sooner. In this case, the access rights for the weak credential may become more restrictive over a shorter period of time (e.g., consecutive intermediate expiration times are more closely spaced) than for a strong credential.

In some embodiments, some of the timing information 314 may be determined based at least in part on resource properties 316. For example, a longer grace period and/or a more gradual restriction of access rights may be provided for a resource regarded to be more secure (e.g., a resource configured with hardware/software protection against intrusion); and vice versa. As another example, a shorter grace period and/or a more abrupt restriction of access rights may be provided for resources regarded as high-security or importance as discussed above; and vice versa.

In some embodiments, the timing information 314 may be determined based at least in part on requestor properties 320 associated with the entity requesting access (e.g., user or account). For instance, the initial expiration time, final expiration time, grace period, and/or the number and spacing of various intermediate expiration times may be determined based on a position, a role, a clearance level, a membership status or payment status, a classification, and the like, of a user, account, or other source of the credential. For instance, a longer grace period or a more gradual credential expiration schedule may be associated with a premium (e.g., paid) account with a service provider than for a non-premium (e.g., free) account. As another example, a manager or a system administrator may be provided a shorter grace period and/or more abrupt credential expiration schedule than a regular employee because the former is deemed to be more responsive. In another case, the reverse may be true because a manager or system administrator is considered busier than an employee and thus is less likely to timely update credentials.

In some embodiments, some of the timing information 314 may be determined based at least in part on historical data 322 such as an entity, time, location, duration, type, scope, frequency associated with previous access by one or more entities to one or more resources, user behavioral data, resource performance or utilization data, and the like. The timing information 314 may be determined based on statistics regarding when users change their credentials. For instance, a shorter grace period, and/or a less gradual access restriction schedule may be provided based on statistics indicating that most users change their credentials before or soon after the initial expiration time. As another example, if historical data indicates that people are less likely to change their credentials during the summer or during the holiday season, the timing information 314 may be adjusted accordingly. For instance, the grace period may be extended and/or the deprivation of access rights made more gradual (e.g., by increasing a number of intermediate expiration times within the grace period) during the summer or the holiday season.

In some embodiments, some of the timing information 314 may be determined based at least in part on environmental factors 324 of an external environment can encompass the physical or virtual environment of a service provider, a user device, a resource, or any other suitable environment. For example, a longer grace period and/or more gradual credential expiration schedule may be provided if the environment factors indicate a relatively secure environment for the requester, the resource to be accessed, and/or the network connecting the requester and the resource, and vice versa. Occurrences of fraudulent or otherwise unauthorized activities may, for example, lead to a shorter grace period and/or a more abrupt credential expiration schedule.

In some embodiments, some of the timing information 314 may be determined based at least in part on policies and regulations 324 including business rules, government laws and regulations, industry standards, and the like. For example, such policies and/or regulations 324 may limit the maximum period of time for a credential to be valid thereby limiting length of the grace period.

In some embodiments, some of the timing information 314 may be determined based at least in part on feedback data 328 such as user input (user comments or survey data), a number of credential reset requests handled by an IT department, an average time between credential updates for one or more users, and the like. For example, the length of the grace period and/or more expiration schedule may be adjusted according to a user's desired schedule. A user that is about to go on a short leave (e.g., vacation, business trip) around the time of the initial expiration time of his credential, for example, may want the grace period to cover at least the length of his leave so that he can still change his credential upon his return. In some embodiments, a user's schedule may be automatically extracted (e.g., from a calendar application on the user's device or from a server) and used to determine the timing information 314 for the user.

Figure 5:
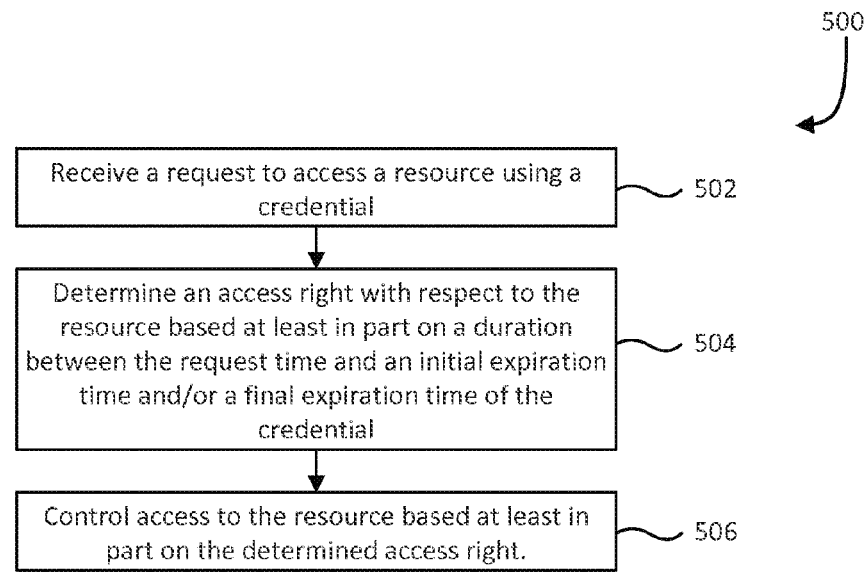
FIG. 5 illustrates an example process for implementing gradual credential expiration, in accordance with embodiments.

FIG. 5 illustrates an example process 500 for implementing gradual credential expiration, in accordance with embodiments. Aspects of the process 500 may be performed, by a user device 204 and/or a server provider 206 such as discussed in connection with FIG. 2. For instance, in some embodiments, aspects of the process 500 may be performed by the access control module 228 and/or the credential management module 229 of the server provider 206 such as discussed in FIG. 2. Alternatively or additionally, aspects of the process 500 may be performed by the access control module 218 and/or the credential management module 219 of the user device 204 such as discussed in FIG. 2. Some or all aspects of the process 500 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

The process 500 can include receiving 502 a request to access a resource using a credential. The request may be configured to obtain authentication and/or authorization for the access. The access request may be received, generated, or sent at a request time. In some embodiments, process 500 can include determining whether the request time occurs before or after an initial expiration time for the credential. As discussed above, the initial expiration time typically represents a "soft" deadline by which the credential is expected to be changed. In some cases, the initial expiration time may be calculated by adding the last time the credential is updated and a predefined initial expiration interval (e.g., 90 days). In some embodiments, the initial expiration time and/or the predefined initial expiration interval may be determined based on any or any combination of factors such as those discussed in FIG. 3, such as credential characteristics, resource properties, requester properties, historic data, environment factors, policies and regulations, feedback data, and the like. For example, a stronger credential may be associated with a longer initial expiration interval (e.g., 120 days) than a weaker credential. As another example, an administrator may be associated with a longer initial expiration interval than a regular employee.

If the request time occurs before the initial expiration time, then the process 500 can include authorizing the request using normal access rules or policies for the requester and/or credential. For example, once the requester is authenticated, the requested is provided full access to the resource that the requested is normally entitled prior to expiration of the credential. Otherwise, if the request time occurs after the initial expiration time, then if the request time occurs after a predetermined grace period after the initial expiration time, then it may be determined that the resource is no longer accessible to the requestor. However, if the request time occurs within the grace period, then the access rights may be determined based on a duration between the initial expiration time and the request time, as described below in step 504 of the process 500.

Instead of or in addition to determining whether the request time occurs before or after an initial expiration time, the process 500 can include determining whether the request time occurs before or after a final expiration time for the credential. As discussed above, a final expiration time of a credential represents a point in time after the initial expiration time, which typically represents a "hard" deadline by which the credential must be changed. In contrast to the initial expiration time, failure to change the credential by final expiration time does result a complete loss of access rights to all the resources previously accessible before the initial expiration time. The period of time between the initial expiration time and the final expiration time is the grace period. In some embodiments, the final expiration time and/or the length of the grace period may be determined based on any or any combination of factors such as those discussed in FIG. 3, such as credential characteristics, resource properties, requester properties, historic data, environment factors, policies and regulations, feedback data, and the like.

If the request time occurs after the final expiration time, then it may be determined that the resource is no longer accessible to the requestor. Otherwise, if the request time occurs before the final expiration time, it may be determined whether the request time occurs within the grace period from the final expiration time. If not, then the process 500 can include authorizing the request using normal access rules or policies. For example, once the requester is authenticated, the requested is provided full access to the resource that the requested is normally entitled to prior to expiration of the credential. Otherwise, if the access time does occur within the grace period, then the access rights may be determined based on a duration between the access time and the final expiration time, as described below in step 504 of the process 500.

The process 500 can include determining 504 an access right with respect to the resource based at least in part on a duration between the initial expiration time and the request time (or an initial-to-request duration) or a duration between the request time and the final expiration time (or a request-to-final duration). In some embodiments, the access right may be determined based at least in part on a comparison between the duration of time (e.g., an initial-to-request duration or a request-to-final duration) and the length of the grace period.

In some embodiments, determining the access right includes determining an access right from a plurality of different access right levels with respect to the resource based at least in part on a duration between the request time and the final expiration time for the credential. The different access right levels may respectively correspond to different durations between the request time and the final expiration time for the credential. As an example, a first access right level may correspond to a duration of 7 days from the access time to the final expiration time. A second access right level may correspond to a duration of 5 days from the access time to the final expiration time. And a third access right level may correspond to a duration of 3 days from the access time to the final expiration time. The first access right level may be higher than the second access right level, which may be higher than the third access right level. For example, the first access right level may allow access to a first set of applications installed on a computer device (resource). The second access right level may allow access to a second subset of the first set of applications. And the third access right level may allow access to a third subset of the second subset of applications. As another example, the first access right level with respect to a computer may be associated access rights of a system administrator, the second access right level may be associated with access rights of an owner of the computer, and the third access right level may be associated with access rights of a non-owner user of the computer.

In some embodiments, determining the access right includes determining an access right from a plurality of different access right levels with respect to the resource based at least in part on a duration between the request time and the initial expiration time for the credential. The different access right levels may respectively correspond to different durations between the request time and the initial expiration time for the credential. As an example, a first access right level may correspond to a duration of 3 days from the access time to the initial expiration time. A second access right level may correspond to a duration of 5 days from the access time to the initial expiration time. And a third access right level may correspond to a duration of 7 days from the access time to the initial expiration time. The first access right level may be higher than the second access right level, which may be higher than the third access right level, as discussed above.

In some embodiments, determining the access right includes selecting an access rule from a plurality of access rules based at least in part on the duration. The plurality of access rules may be specified based at least in part on the duration (e.g., initial-to-request duration or request-to-final duration). For instance, in some embodiments, the longer the initial-to-request duration (or the shorter the request-to-final duration), the more restrictive the access rights are. To illustrate, an exemplary access rule may specify that "if 0 days<initial-to-request duration<=2 days, then allow access to email and browser." Another more restrictive access rule may specify that "if 2 days<init-to-request duration<=4 days, then allow access to email only." If the grace period is 10 days, the above rules may specified alternatively as "if 8 days<=request-to-final duration<10 days, then allow access to email and browser," and "if 6 days<=request-to-final duration<8 days, then allow access to email only," the latter rule more restrictive than the former. As shown, more restrictive access rules may be triggered as the request time gets closer to the final expiration time. Additionally or alternatively, the access rules may be based on other factors besides the timing information, such as discussed in FIG. 3. In some embodiments, the access right may be determined duration of time may be compared with a plurality of predefined intermediate durations as discussed in further detail in FIG. 8. While reference is made with respect to one access rule and one access right, it is understood that in various embodiments, one or more access rules may be triggered and used to generate one or more access rights with respect to a resource.

Once the access right is determined, the process 500 can include controlling 506 access to the resource based at least in part on the determined access right. In some embodiments, controlling access to the resource may include providing a level of access to the resource based at least in part on the level of determined access right. Providing a level of access to a resource may include locking, unlocking, encrypting, unencrypting, hide, unhide, enable, disable, otherwise manage the resource or components thereof in order to achieve the desired access level. For instance, if determined access right is limited access to an email application installed on a device, then other applications may be locked or otherwise disabled. If the determined access right is limited to access to non-sensitive data, then access to sensitive data may be blocked or the sensitive data may be masked or otherwise rendered inaccessible.

In some embodiments, controlling access to the resource may include generating a response corresponding to the previously received access request based on the access right. For example, the response may include an indication of whether access is allowed or denied with respect to a resource. Additionally or alternatively, the response may include an indication of a certain type, duration, and/or scope of access to the resource. The response may include a token or other data object that can be used to verify an authentication status and/or authorization status. In some other embodiments, the requested resource (e.g., data, web service) or a portion thereof may be provided directly or indirectly in one or more responses. In some other embodiments, a response may not be provided at all. Instead, messages may be provided to other entities (e.g., third-party entities) to control the access.

Figure 6:
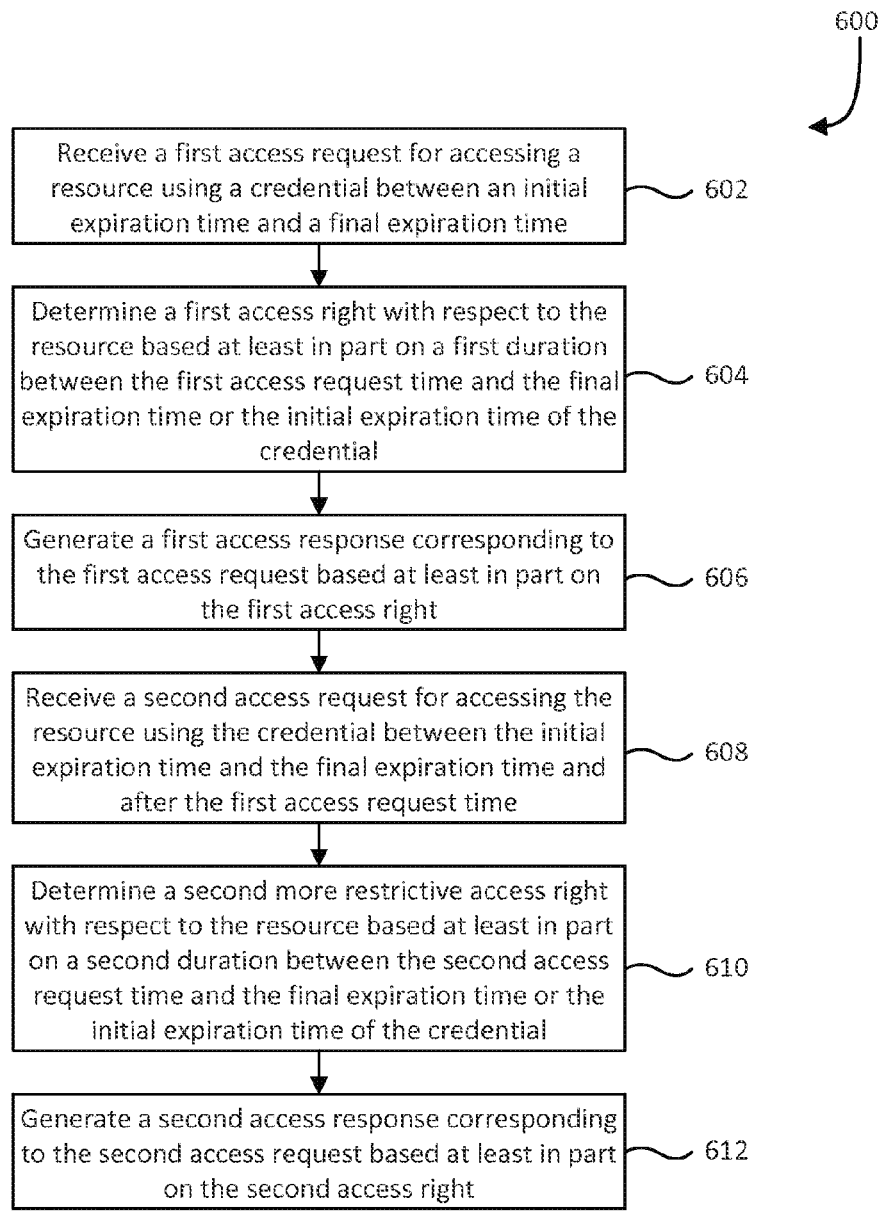
FIG. 6 illustrates an example process for providing different access rights based on different timing information, in accordance with embodiments.

FIG. 6 illustrates an example process 600 for providing different access rights based on different timing information, in accordance with embodiments. Specifically, in some embodiments, more restrictive access rights toward the final expiration time. In some embodiments, aspects of the process 600 may be performed, by a user device 204 and/or a server provider 206 such as discussed in connection with FIG. 2.

Process 600 includes receiving 602 a first access request for accessing a resource using a credential. The first access request may be received between an initial expiration time associated with the credential and a final expiration time. In some embodiments, the final expiration time is determined by adding a predetermined grace period to the initial expiration time. The length of the grace period may be determined based on various factors such as those discussed in FIG. 3.

In response, a first access right may be determined 604 with respect to the resource based at least in part on a first duration. The first duration may be the period of time between the first access request time and the final expiration time or the period of time between the initial expiration time and the first access request time. In some embodiments, the access right may be determined using techniques similar to those described in FIGS. 5, 7, and 8.

Once the first access right is determined, first access response may be generated 606 based at least in part on the first access right. The first access response is responsive to the first access request. In some embodiments, the first access response may be generated as discussed with respect to step 506 of FIG. 6.

Subsequently, a second access request for accessing a resource using the credential may be received 608. The second access request may be received between the initial expiration time and the final expiration time, but after the first access request time.

In response, a second access right may be determined 610 with respect to the resource based at least in part on a second duration. The second duration may be the period of time between the second access request time and the final expiration time or the period of time between the initial expiration time and the second access request time. In some embodiments, the access right may be determined using techniques similar to those described in FIGS. 5, 7, and 8. In particular, the second access right may be more restrictive than the first access right because the second access right is received after the first access right and therefore closer to the final expiration time. For example, the first access right may be configured to allow access to the resource while the second access right may be configured to deny access to the resource. As another example, both the first access right and the second access right may be configured to allow access to the resource but the second access right is more restrictive than the first access right in terms of a type, duration, and/or scope of the access.

Once the second access right is determined, first access response may be generated 612 based at least in part on the second access right. The second access response is responsive to the second access request. In some embodiments, the second access response may be generated in a fashion similar to the first access response.

Figure 7:
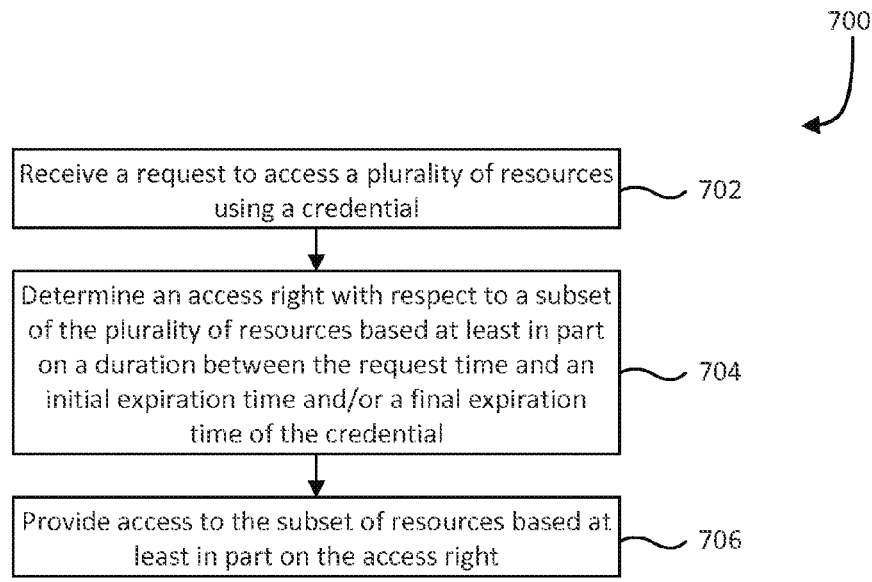
FIG. 7 illustrates an example process for implementing gradual credential expiration, in accordance with embodiments.

While processes 500 and 600 are discussed with respect to one resource, it is understood that a similar process may be used to control access to a plurality of resources. FIG. 7 illustrates an example process 700 for implementing gradual credential expiration, in accordance with embodiments. Specifically, as time progresses towards the final expiration time, access may be granted to a restrictive subset of a plurality of previously accessible resources. In some embodiments, aspects of the process 700 may be performed, by a user device 204 and/or a server provider 206 such as discussed in connection with FIG. 2.

The process 700 includes receiving 702 a request to access a plurality of resources using a credential. The request may be received at a time that after an initial expiration time but before a final expiration time associated with the credential. The plurality of resources can include one or more services, computer devices, data objects or any other resources discussed herein. In some embodiments, the initial expiration time, the final expiration time, and/or the grace period are determined based at least in part on one or more of the factors discussed in FIG. 3, such as one or more attributes associated with the requester, with the credential, or with at least one of the plurality of resources.

In response to the access request, one or more access rights can be determined 704 with respect to a subset of the plurality of resources based at least in part on a duration between the request time and an initial expiration time and/or a duration between the request time and a final expiration time of the credential. In some embodiments, the determination of the access rights may include comparing the duration with one or more intermediate durations, each of the one or more intermediate durations associated with a set of one or more access rules. Based on the comparison, an intermediate duration and its intermediate rule set may be selected from the one or more intermediate durations. The access rules in the selected rule set may be used to determine one or more access rights. In some embodiments, the access rules may include additional conditions based on one or more factors such as those discussed in FIG. 3, thus, the access rights may be determined further based on such factors. Further details are provided in the discussion of FIG. 8. The access rights may be configured to provide access to only a subset, rather than all, of the plurality of resources requested, because more restrictive access rights are in place in the grace period compared with the pre-initial-expiration-time access rights.

Finally, the process 700 includes providing 706 access to the subset of resources based at least in part on the determined one or more access rights. For instance, one or more responses may be generated and provided to the requester regarding the subset of resources for which access is allowed. The responses may also include information regarding the access rights that are granted including, for example, a type, duration, and/or scope of access, for each of the subset of resources. Such information may be used (e.g., by the requester and/or the resource provider) to guide and/or monitor the requester's access. In some embodiments, the process 700 can further include denying access to a second subset of the resources requested based on the determined access rights. For instance, if access is requested for resources A, B, and C, and the access rights indicate that access is allowed for A and B, then it may be determined that access is denied for the remaining resource C.

Figure 8:
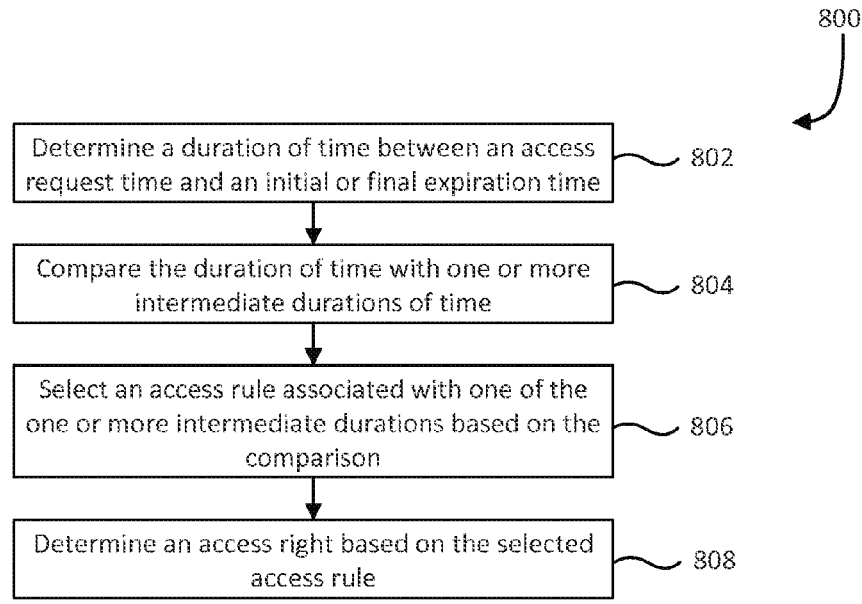
FIG. 8 illustrates an example process for determining an access right based on a plurality of intermediate durations, in accordance with embodiments.

FIG. 8 illustrates an example process 800 for determining an access right based on a plurality of intermediate durations, in accordance with embodiments. The process 800 may be used, for example, to implement steps 504, 604, 610, or 704 of FIG. 5, 6, or 7, respectively. In some embodiments, aspects of the process 800 may be performed, by a user device 204 and/or a server provider 206 such as discussed in connection with FIG. 2.

The process 800 includes determining 802 a duration of time (request duration) between an access request time and an initial expiration time or between an access request time and an initial expiration time of a credential.

The request duration can be compared 804 with one or more intermediate durations of time, each of the one or more intermediate durations associated with a set of one or more access rules. The one or more intermediate durations may be relative to the initial expiration time or to the final expiration time, depending on which expiration time the request duration measured against. That is, if the request duration is measured relative to the initial expiration time, then the intermediate durations are measured from one or more intermediate expiration times to the initial expiration time. On the other hand, if the request duration is measured relative to the final expiration time, then the intermediate durations are measured from one or more intermediate expiration times to the final expiration time. In some embodiments, the one or more intermediate durations are determined based on one or more of the factors discussed in FIG. 3 such as one or more attributes associated with at least one of the requester, the credential, or at least one of the plurality of resources.

As the intermediate durations progress toward the final expiration date, rule sets may get more restrictive. For example, when the intermediate durations are measured relative to the initial expiration time, the longer the duration the more restrictive the associated rule set may be. On the other hand, when the intermediate durations are measured relative to the final expiration time, the shorter the duration the more restrictive the associated rule set may be. For example, a first set of access rules associated with a first intermediate duration may be configured to allow access to a resource that a second, more restrictive set of access rules are configured to prevent access to.

Based on the comparison, an access rule associated with one of the one or more intermediate durations may be selected 806. In particular, based on the comparison, an intermediate duration and its intermediate rule set may be selected from the one or more intermediate durations. For instance, in some embodiments, the shortest intermediate duration that is the same as or longer than the request duration, along with its associated set of access rules, is selected.

The access rules in the selected rule set may be used to determine 808 one or more access rights. In some embodiments, the access rules may include additional conditions based on one or more factors such as those discussed in FIG. 3, thus, the access rights may be determined further based on such factors.

In some embodiments, notification messages may be provided to users under various circumstances. In an example, a user may be authorized to access a resource within a certain timeframe (an authorization window). In this example, a notification message may be provided to a user before the authorization window closes to alert the user of the pending loss of access. In some embodiments, notification messages can be provided periodically or in response to a predetermined event. For instance, notification messages can be provided in response to an access event (e.g., viewing or modifying data, log in/log off) or any other user activity. In some other embodiments, notifications can be provided without requiring user activity. For example, a daily notification message (e.g., email message) can be sent to a user stating "You will lose access to all of the following resources unless you update your password in N days."

The notifications can be provided inline. For example when a user is viewing a webpage, a notification message can be provided at the top of the webpage stating that the user would lose access at certain time or within certain timeframe unless the user's credential (e.g., password) is updated. In other examples, notifications can be provided out of band, e.g., via text messages, emails, phone calls, fax messages, and the like.

In some embodiments, a permission listing service may be provided (e.g., by an authorization service) based on the gradual credential expiration methods described herein. The permission listing service can leverage the variable expiration policies described herein to determine user's access rights. However, being triggered by access events, the permission listing service may be invoked by specific queries to indicate what permissions a user has at a specific point in time. Such a permission listing service may be configured to receive a query with respect to a given user and/or resource and provide access control information in response. For example, given a user and a resource, the permission listing service may provide a list of all the permissions that the user has on the resource. As another example, given a user and a permission X (e.g., read/write access), the permission listing service may provide a listing of all the resources that the user has the permission X. In some embodiments, such permission listing service may be provided in addition to or instead of authorization checks performed in response to access requests. For example, a user interface module configured to display a list of links to resources available to a user can query the permission listing service so as to determine whether to hide or show certain links. For instance, a user interface configured to display recruiting tools of a user may query the permission listing service so as to restrict the candidates that can be seen by the user and/or the actions the user can take with respect to the candidates. In an alternative embodiment, the list may include all the resources a user potentially has access to, but include metadata to indicate a subset of the resources that require different/stronger credentials. Continuing with the example of the recruiting tool, this would allow the user to see a list of all the names in the user's recruiting pipeline, but if one of the candidates requires a stronger degree of authentication (maybe it is a confidential secret candidate) then when the user clicks on the candidate's name, the user may be prompted to reset password. Other candidates may remain actionable, however.

Figure 9:
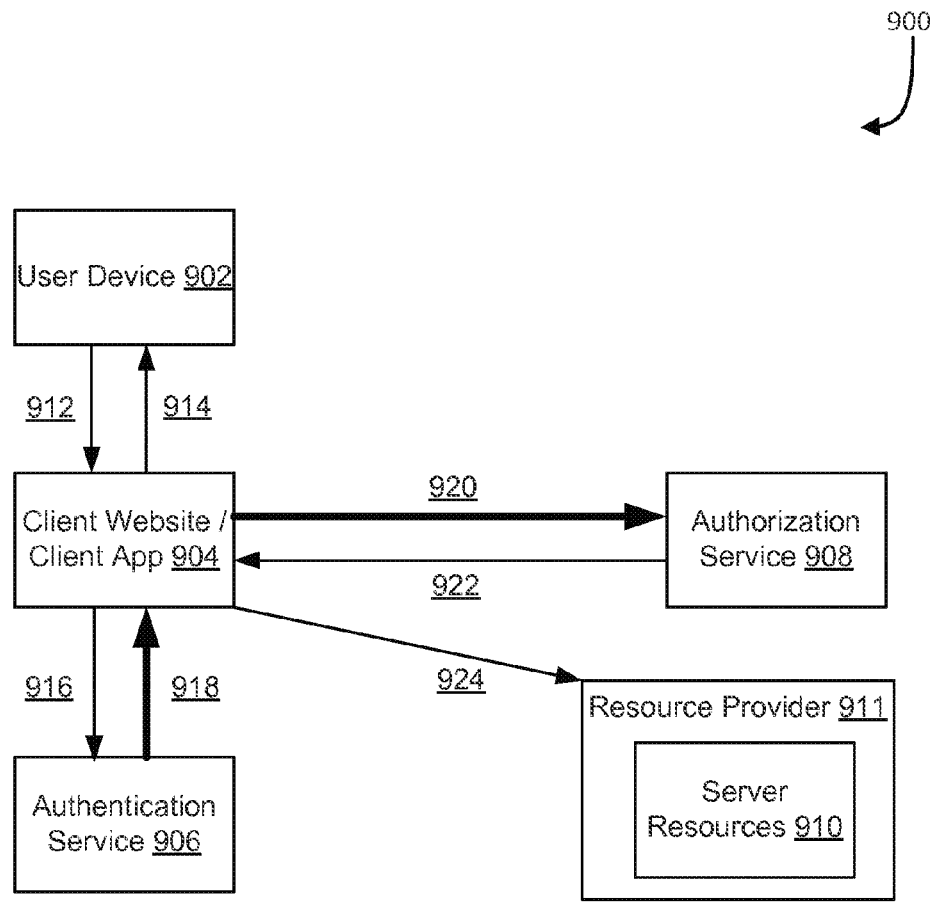
FIG. 9 illustrates an example authorization system 900, in accordance with embodiments.
Figure 10:
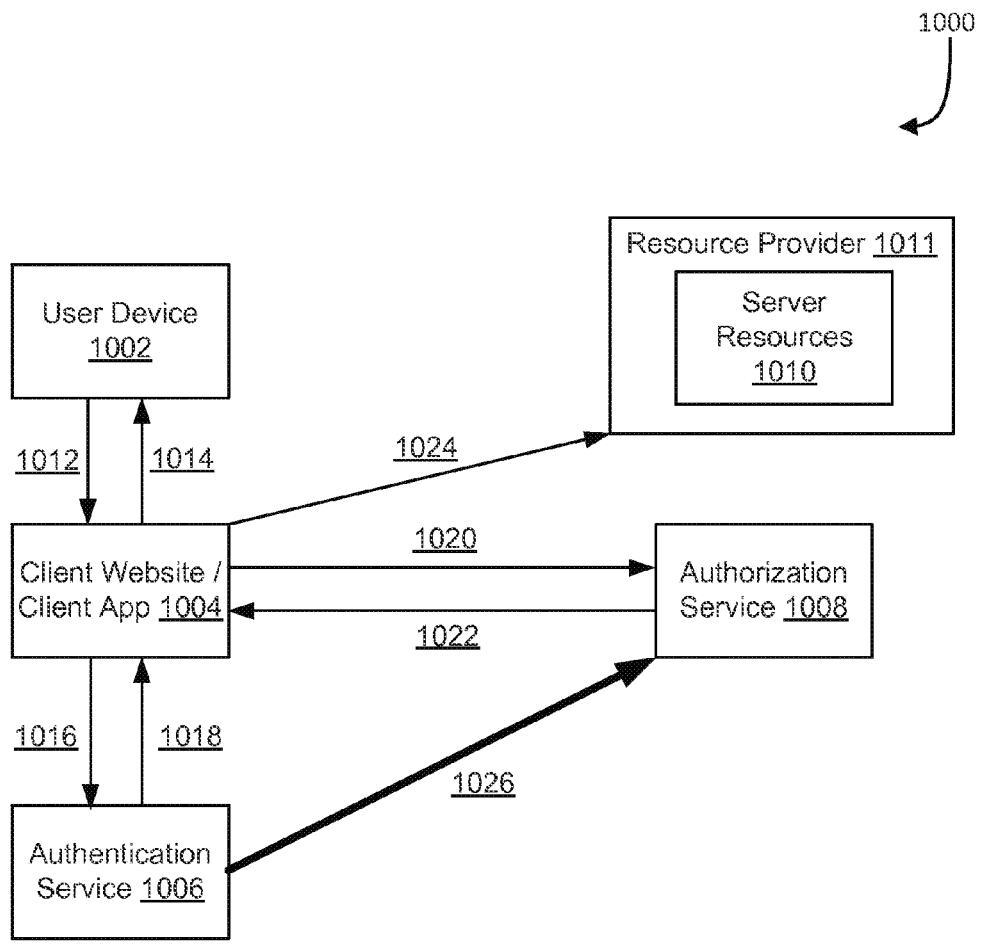
FIG. 10 illustrates another example authorization system 1000, in accordance with embodiments.

According to aspects of the present disclosure, an authentication service can be configured to provide additional information such as credential-related data to enable access control based on such additional information using techniques described herein. For example, the credential-related data can include credential properties such as last updated time and the access control can include gradual restriction of access rights based on the credential properties. As illustrated in FIGS. 9-10, a user can operate a user device 902, 1002 to access a client website or application 904, 1004. The client website or application 904, 1004 can be implemented by one or more client devices such as a server that hosts or implements a client website and/or a user device that runs a client application. The client website or application 904, 1004 may be configured to authenticate the user using an authentication service 906, 1006 in order to obtain authorization from an authorization service 908, 1008. The obtained authorization may be used to gain access to one or more server resources 910, 1010. In some embodiments, the server resources 910, 1010 are provided or hosted by a resource provider 911, 1011 and owned or accessible (after being authenticated) by the user operating the user device 902, 1012. Examples of such server resources may include a customer's profile data such as contact information, account information, social network data, and the like in an electronic marketplace and computing resources provisioned to the user by the resource provider 911, 1011. Thus, the authorization systems 900, 1000 can be used to allow the user to grant client website or application 902, 1002 access to her server resources using her credential with the resource provider 911, 1011. In this regard, aspects of the authorization systems 900, 1000 may be similar to a delegated authorization system such as Oauth or OpenID.

In some embodiments, the authentication service 906, 1006 and/or the authorization service 908, 1008 may be provided by the resource provider 911, 1011 that provides the server resources 910, 1010. In some other embodiments, the authentication service 906, 1006 and/or the authorization service 908, 1008 may be provided by a different entity than the resource provider 911, 1011. In some embodiments, the authentication service 906, 1006 and the authorization service 908, 1008 may be implemented by the same computing component(s) or device(s). For instance, a module may be configured to implement both the authentication service 906, 1006 and the authorization service 908, 1008. In some other embodiments, the authentication service 906, 1006 and the authorization service 908, 1008 may be implemented by the different computing component(s) or device(s). For instance, an authentication server may be configured to implement the authentication service 906, 1006 and a different authorization server may be configured to implement the authorization service 908, 1008.

FIG. 9 illustrates an example authorization system 900, in accordance with embodiments. A user may operate the user device 902 to access 912 the client website or application 904. For example, the user may point a browser application on the user device 902 to a URL associated with a client website (e.g., a login page). Alternatively, the user may launch a client application 904 that is installed on the user device 902.

In some embodiments, the user may be optionally redirected 914 to an interface provided by a third-party authentication service 906 and/or the resource provider 911. In alternative embodiments, the user may not be redirected. Instead, the user may be allowed to login using the third-party credential from within the client website or application 904. Alternatively, the user may be allowed to login using the user's credential with the client website or application 904. In some embodiments, a login page associated with the client website or application 904 may include a user interface control (e.g., button) that allows the user to login using a third-party credential (e.g., credential with the resource provider) instead of the user's credential with the client website or application 904. By selecting (e.g., clicking on) the user interface control, the user can be redirected to a second login page provided by the authentication service 906 and/or the resource provider 911 where the user can input her credential with the resource provider 911. Before or after the redirection, the user may be prompted to grant access the client website or application 904 access to her data hosted at the resource provider (e.g., customer profile data). The user may be prompted to select a scope associated with the granted access. After successfully logging in using the third-party credential, the user can be redirected back to the client website or application 904.

The provided user credential (e.g., username and/or password) can be provided 916 to the authentication service 906, for example, in an authentication request message. The authentication request message may be sent from a client device implementing the client website or application 904 including a web server, a user device, or any other suitable device. The user credential may include a credential with the resource provider 911 and/or a credential with the client website or application 904. The authentication request message can also identify a resource to be accessed. The resource may include a server resource (e.g., customer profile data) that is provided by a resource provider. In some embodiments, the authentication request message may include other information besides user credential such as a timestamp of the authentication request, attributes of the user device and/or client website or application 904 (e.g., client identifier), a scope or duration of the requested access, and the like.

The authentication service 906 may authenticate the user credential. For instance, the authentication service 906 may verify the credential against a credential data store similar to those discussed in FIG. 2. In some embodiments, the authentication service 906 may be configured to communicate with the resource provider 911 in order to authenticate the credential. The authentication service 906 may be configured to generate an authentication result based on the authentication of the credential. For instance, the authentication result may indicate whether the credential is valid.

In some embodiments, the authentication service 906 may be configured to provide additional information (as indicated by the thicker arrow 918) besides the authentication result. The additional information may allow an entity (e.g., an authorization service or a client website or application) to implement access control methods such as those described herein. For instance, the additional information may be operable for determining or selecting an access right with respect to a resource from a plurality of access right levels. Each of the plurality of access right levels may be respectively associated with a plurality of different intermediate durations between an initial expiration time and a final expiration time for the credential. For instance, the last updated time of the credential may be used to determine a duration between an access request time and the initial expiration time of the credential. Such a duration may be compared with the plurality of intermediate durations, each of which being associated with an access rules set that can be used to determine an access right level with respect to the resource. In some embodiments, the access right levels get progressively more restrictive towards the final expiration time of the credential.

In some embodiments, the additional information may include one or more properties about the credential (credential-related data). The one or more properties may include information related to the expiration of the credential such as a timestamp of the last time the credential was updated (a last updated time), an initial expiration time, a final expiration time of the credential, or any combinations thereof. The credential properties can also include information that are indicative or can be used to derive a strength of the credential, such as a length or size of and/or complexity of credential. Additionally or alternatively, the credential properties can include information related to an owner or issuer of the credential, scope of the credential, and any other suitable information. In some embodiments, the additional information may include some of the access rule factors discussed in FIG. 3.

The additional information (e.g., credential properties) provided by the authentication service 906 may be determined based on instructions specified by a consumer of the information such as the client website or application 904 or the authorization service 908. Additionally or alternatively, the additional information can be provided based on instructions provided by the owner of the credential (e.g., the user), the resource provider 911, and the like. For instance, the instructions may include a set of rules that specify which credential properties should be provided for a given type of credentials, specific credential properties to be provided for a given user or a given group of users, specific credential properties to be provided for a given client website or application 904 or for a given authorization service 908, and the like. In some embodiments, the additional information may be provided in response to an explicit request for such information. For instance, the authorization service 908 may be configured to call the authentication service to obtain any credential properties that it requires to make access control decisions. The request may specify the types of information that is needed by the authorization service.

In some embodiments, the authentication service 906 may be configured to communicate with the resource provider 911 in order to determine the additional information (e.g., credential properties). For instance, the authentication service 906 may obtain some or all of the additional information from the resource provider 911 and/or retrieve such information from a data store operably connected to the resource provider 911.

The authentication service 906 can be configured to provide 918 the authentication result and/or the additional information (e.g., credential properties) in one or more response messages to the client website or application 904. For instance, the authentication result and/or the additional information can be included in an authentication response message corresponding to the authentication request message discussed above.

In some embodiments, the authentication result and/or the additional information may be encapsulated in an authorization code that is included in the authentication response message. The authorization code may be configured to expire within a certain period of time (e.g., 1, 5, or 10 minutes) to mitigate the risk of leaks. The authorization code may be bound to a specific client website or application (e.g., a client identifier) and/or a redirection URI of the client website and/or application. In some implementations, the authorization code may not be used more than once by the client website or application to prevent fraudulent transactions. In other embodiments, the authorization result and/or the additional information may be included in the authentication response message but not in the authorization code itself. In various embodiments, the authentication result and/or the additional information may be encrypted, digitally signed, or otherwise protected in the authentication response message.

The client website or application 904 may be configured to receive the authentication response message and pass on 920 at least some of the additional information (e.g., credential properties, as indicated by the thicker arrow 920) included in the authentication response message to the authorization service 908 to obtain an access token for a resource. For instance, where the authentication response message includes an authorization code, the client website or application 904 can be configured to provide the authorization code to the authorization service 908. Where the authentication response message includes the additional information discussed above (e.g., credential properties), the client website or application 904 can be configured to provide some or all of the additional information to the authorization service 908 (e.g., as part of the authorization code or separate from the authorization code).

The authorization code and/or the additional information may be included in an authorization request message that is sent 920 from the client website or application 904 to the authorization service 908. In some embodiments, the authorization request message may include information to authenticate the client website or application 904 such as a client identifier identifying the client website or application 904, a client secret, and the like. In some embodiments, the authorization request message may also include an identification of a resource for which access is sought, a duration and/or scope of the access, and the like. The resource may be a server resource 910 provided by the resource server 911.

The authorization service 908 may be configured to receive the authorization request message including the authorization code and/or the additional information (e.g., credential properties). The authorization service 908 may authenticate the client website or application 904 using information provided in the authorization request message (e.g., authorization code, client identifier, client secret, etc.) and determine an access token indicating one or more access rights with respect to the resource. The access rights with respect to the resources may be determined based at least in part on authorization code included in the authorization request message. Additionally or alternatively, the access rights may be determined based at least in part on the additional information (e.g., credential properties) that is included in the authorization request message. The authorization service may be configured to extract the additional information from the authorization request message and/or authorization code. For instance, if the additional information is encrypted in the authorization request message, the authorization service may be configured to decrypt some or all portions of the authorization request message to obtain the decrypted additional information.

The authorization service 908 may be configured to determine access rights with respect to the resource based at least in part on the additional information (e.g., credential properties) that is included in the authorization request message. In some embodiments, a duration between a request time and an initial or final expiration time for the credential may be determined based at least in part on the credential properties. For instance, an initial expiration time may be determined by adding a predefined initial expiration interval (e.g., 90 days) to the last updated time of the credential. A final expiration time may be determined by adding a predefined final expiration interval (e.g., 110 days) to the last updated time of the credential or by adding a predefined grace period (e.g., 20 days) to an initial expiration time of the credential.

In some embodiments, methods such as described in FIGS. 5-8 may be used in determining an access right with respect to the resource. An access right may be determined with an access right level of a plurality of different access right levels with respect to the resource based at least in part on the duration, the different access right levels respectively corresponding to different durations between the request time and the initial or final expiration time for the credential. In some embodiments, determining an access right comprises comparing the determined duration and one or more intermediate durations relative to the initial expiration time or the final expiration time where each of the one or more intermediate durations is associated with a set of one or more access rules, selecting one of the one or more intermediate durations based on the comparison, and determining the access right based at least in part on the set of access rules associated with the selected intermediate durations. In some embodiments, the rule sets get progressively more restrictive towards the final expiration time. Thus, if the intermediate durations are measured relative to the initial expiration time, the longer the intermediate duration, the more restrictive the associated rules set. If the intermediate durations are measured relative to the final expiration time, the shorter the intermediate duration, the more restrictive the associated rules set.

In some embodiments, the authorization service 908 may be configured to communicate with the resource provider 911 or any other suitable entities in order to determine access rights with respect to the resource. For instance, the authorization service 908 may be configured to obtain information such as access rule factors 312 discussed in FIG. 3 and use the obtained information to determine access rights using methods discussed herein.

The authorization service 908 may be configured to provide 922 an authorization response message to the client website or application 904. The authorization response message can include an access token that indicates the determined access right(s) with respect to the resource. The client website or application 904 can provide 924 the access token to the resource provider 911 to obtain access to the server resources 910 (e.g., customer profile data).

In some embodiments, the client website or application 904 may be configured to implement access control in addition to or instead of the access control provided by the authorization service 908. For instance, the client website or application 904 may be configured to determine access rights with respect to a resource based on the additional information (e.g., credential data) provided by the authentication service 906 using methods similar to those discussed in FIGS. 5-8. For instance, the client website or application 904 may be configured to determine a duration between a request time and an initial or final expiration time for the credential based at least in part on one or more credential properties. An access right may be determined based at least in part on the duration and the access right can have an access right level of a plurality of different access right levels with respect to the resource the different access right levels respectively corresponding to different durations between the request time and the initial expiration time or final expiration time for the credential. In some embodiments, determining an access right comprises comparing the determined duration and one or more intermediate durations relative to the initial expiration time or the final expiration time where each of the one or more intermediate durations is associated with a set of one or more access rules, selecting one of the one or more intermediate durations based on the comparison, and determining the access right based at least in part on the set of access rules associated with the selected intermediate durations. In some embodiments, the rule sets get progressively more restrictive towards the final expiration time as discussed above.

Using the methods discussed herein, the client website or application 904 may be configured to provide access control for a server resource 910. The access control over the server resource may be in addition to or instead of the access control provided by the authorization service 908 (e.g., as indicated by the access token).

In some other embodiments, the client website or application 904 may be configured to provide access control for a client resource provided by the client website or application 904. Such client resources may include data or computing resources provided by the client website or application 904 to the user device 902. In some embodiments, the resource may be provided by an entity that provides the authentication response (e.g., authentication service provider or resource provider). In some other embodiments, the resource may be a resource that is provided by an entity that receives the authentication response (e.g., the client website or application 904).

FIG. 10 illustrates another example authorization system 1000, in accordance with embodiments. The illustrated system is similar to the authorization system 900 of FIG. 9, except that the additional information may be provided directly from the authentication service 1006 to the authorization service 1008. In some cases, such an approach may reduce the risk of leaks of confidential information by bypassing the client website or application 1004.

A user may operate the user device 1002 to access 1012 the client website or application 1004. For example, the user may point a browser application of the user device 1002 to a URL associated with a client website (e.g., a login page). Alternatively, the user may launch a client application 1004 that is installed on the user device 1002.

In some embodiments, the user may be optionally redirected 1014 to an interface provided by a third-party authentication service 1006 and/or the resource provider 1011 similar to step 914 discussed in FIG. 9.

The user may provide 1016 a credential (e.g., username and/or password) to the authentication service 906, for example, in an authentication request message similar to the authentication request message discussed in FIG. 9. The authentication service 1006 may authenticate the user credential in a similar manner as the authentication service 906 discussed in FIG. 9.

Unlike the authentication service 906, the authentication service 1006 can be configured to provide 1018 an authentication response message that does not include any additional information (e.g., credential properties). For instance, the authentication response message may include an authorization code that indicates whether the user has been authenticated. The authorization code may be configured to expire within a certain time period (e.g., 1, 5, or 10 minutes) to mitigate the risk of leakage. The authorization code may be bound to a specific client website or application (e.g., a client identifier) and/or a redirection URI of the client website and/or application. In some implementations, the authorization code may not be used more than once by the client website or application to prevent fraudulent transactions.

The client website or application 1004 may be configured to receive the authentication response message and pass on 1020 at least some of the information included in the authentication response message to the authorization service 1008 to obtain an access token for a resource. For example, the authorization request message may include the authorization code that was provided by to the client website or application 1004 in the authentication response message. In some embodiments, the authorization request message may include information to authenticate the client website or application 1004 such as a client identifier identifying the client website or application 1004, a client secret, and the like. In some embodiments, the authorization request message may also include an identification of a resource for which access is sought, a duration and/or scope of the access, and the like. The resource may be a server resource 1010 provided by the resource server 1011. Note the client website or application 1004 does not have access to the additional information for access control (e.g., credential properties) since such information was never transmitted to the client website or application 1004 from the authentication service 1006. Thus, the risk of leaks of confidential information is limited.

The authorization service 1008 may be configured to receive the authorization request message including the authorization code (e.g., credential properties). The authorization service 1008 may authenticate the client website or application 1004 using information provided in the authorization request message (e.g., authorization code, client identifier, client secret, etc.) and determine an access token indicating access rights with respect to the resource. The access token may then be used by the client website or application 1004 to access 1024 the server resources 1010.

The access rights with respect to the resources may be determined by the authorization service 1008 based at least in part on authorization code. Additionally or alternatively, the access rights with respect to the resources may be determined based at least in part on the additional information for access control obtained from the authentication service 1006 (as indicated by the thicker arrow 1026) or from the resource provider 1011. Such additional information may include credential properties or any other relevant information such as the access rule factors discussed in FIG. 3. In some embodiments, the authorization service 1008 may be configured to obtain such additional information via an application programming interface (API) provided by the authentication service 1006 or the resource provider 1011. In some embodiments, the authorization server 1008 may be configured to determine the access rights with respect to a resource using methods such as discussed above in FIG. 9.

Variations of aspects of methods and systems described above are also considered as being within the scope of the present disclosure. For example, in some embodiments, access rights may be determined by comparing an access request time with a plurality of intermediate expiration times, instead of or in addition to comparing the request duration with intermediate durations. As another example, the request duration can be measured from an access request time to any fixed point in time that is not an initial expiration or a final expiration time. For instance, the request duration can be measured against the last time a credential is updated.

The techniques described herein can be used, by a credential management service, to provide gradual credential expiration of master credentials used to access to a plurality of child credentials. The credential management service may be configured to manage, for each user, a master credential (e.g., master password, cryptographic key) that is used to access a plurality of child credentials. Each of the child credentials may be used to access (e.g., log in to) various online services. Thus, users only need to memorize their master credentials instead of all the child credentials; instead, the child credentials can be retrieved automatically using the master credential. Under the techniques described herein, a mater credential may be associated with an initial expiration time and a final expiration time, where access rights to the child credentials (treated as resources) are restricted during the grace period between the initial expiration time and the final expiration time. The degradation and/or deprivation of access rights may be gradual. For instance, the set of child credentials retrievable with the master credential may decrease as time gets closer to the final expiration time. The access rights with respect to the child credentials may be determined using a one or more access rules associated with the grace period and/or with different intermediate intervals within the grace period, as discussed herein.

The techniques described herein can be used to manage and enforce software updates. Users who do not timely update their software may experience gradually degrading services in order to encourage them to update their software. In an implementation, an access request may include a version of a software product currently installed on the user device instead of or in addition to a credential. The relative distance (e.g., in time, or version number) between the user's software version and the latest or otherwise appropriate software version for the user device (also referred to as the target software version or target version) may be determined. The distance may indicate how far behind the user's software version is (e.g., relative to the target version). For example, the distance may be expressed as the number of versions that have been released between the user's software version and the target version. The distance may be used, at least in part, to determine access rights of the user, in a manner similar to the way the duration between an access request time and an initial expiration time for a credential is used to determine access rights. For instance, the greater the distance is, the more restrictive the access rights may become until a maximum distance is reached when access to resources is denied completely. In some embodiments, different sets of access rules may be associated with different distances similar to the way different rules sets can be associated with different intermediate durations for credential expiration discussed herein.

As another example, the techniques described herein can be used to provide degradation and/or deprivation of access rights with respect to physical objects such as (e.g., buildings and vehicles), energy (e.g., water, heat, electricity), and the like, in addition to or instead of electronic resources such as computing devices and electronic data.

As yet another example, the techniques described herein can be used to manage expiration of one or more factors used in multi-factor authentication. For example, the techniques can be used to provide gradual expiration of a knowledge factor in multi-factor authentication, such as a password, a personal identification number (PIN), secret question, cryptographic key, and the like.

Figure 11:
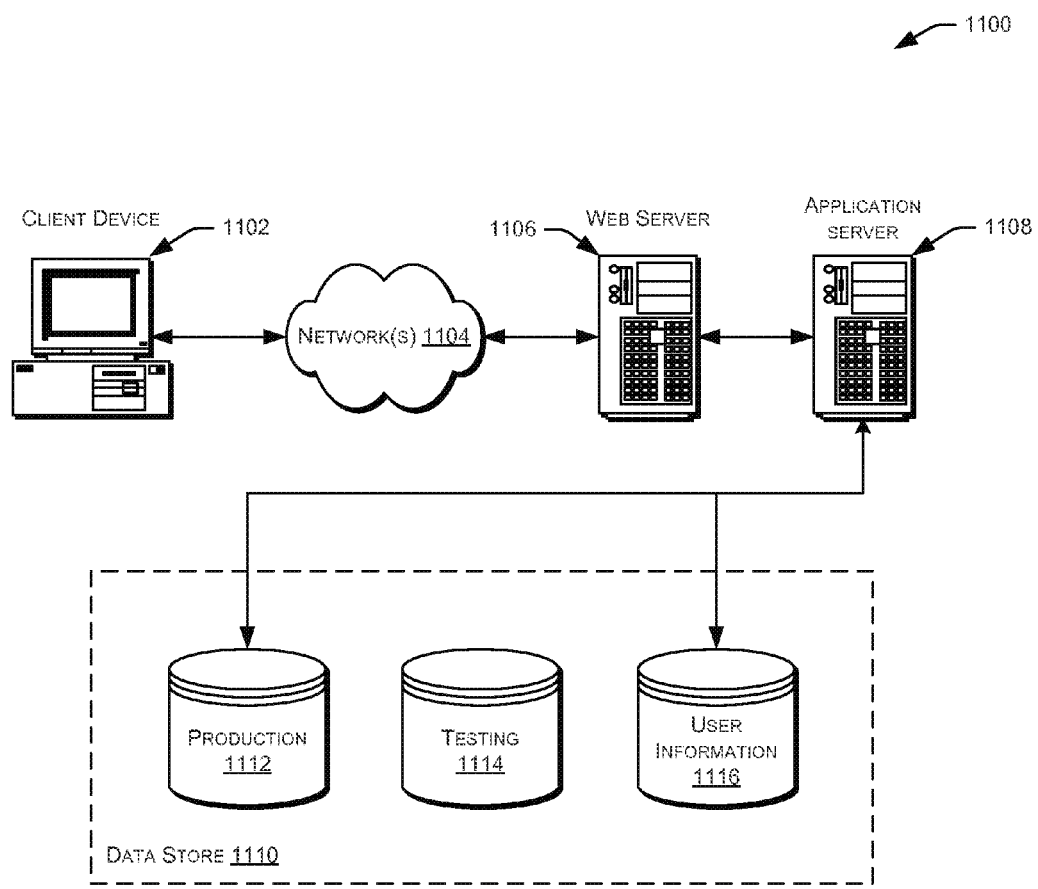
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 1100 in FIG. 11 should be taken as being illustrative in nature and not limiting to the scope of the disclosure.

Embodiments of the disclosure can be described in view of the following clauses:

Clause 1: A computer-implemented method, comprising:

receiving, at a first access request time, a first access request for accessing a resource using a credential, the first access request time occurring after an initial expiration time associated with the credential and before a final expiration time, the final expiration time determined by adding a predetermined grace period to the initial expiration time;

determining a first access right with respect to the resource based at least in part on a first duration between the first access request time and the final expiration time;

generating a first access response corresponding to the first access request based at least in part on the first access right;

receiving, at a second access request time, a second request for accessing the resource using the credential, the second access request time occurring after the first access request time and before the final expiration time;

determining a second access right with respect to the resource based at least in part on a second duration between the second access time and the final expiration time, the second access right being more restrictive than the first access right; and generating a second access response corresponding to the second access request based at least in part on the second access right.

Clause 2: The computer-implemented method of clause 1, wherein the first access right is configured to allow access to the resource and the second access right is configured to deny access to the resource.

Clause 3: The computer-implemented method of clause 1, wherein the first access right is configured to allow read/write access to the resource and the second access right is configured to allow read-only access to the resource.

Clause 4: The computer-implemented method of clauses 1 to 3, wherein the credential includes at least one of a password, a cryptographic key, or a digital certificate.

Clause 5: One or more non-transitory computer-readable storage media storing computer executable instructions that, when executed by a computing system, configure the computing system to perform operations comprising:

in response to receiving a request to access a resource using a credential, determining an access right with a level of a plurality of different access right levels with respect to the resource based at least in part on a duration between a request time associated with the request and a final expiration time for the credential, the different access right levels respectively corresponding to different durations between the request time and the final expiration time for the credential; and providing a level of access to the resource based at least in part on the level of determined access right.

Clause 6: The computer-readable storage media of clause 5, wherein the request time occurs after an initial expiration time for the credential and the access right is determined based at least in part on a second duration between the request time and the initial expiration time.

Clause 7: The computer-readable storage media of clauses 5 to 6, wherein determining the access right comprises:

selecting an access rule from a plurality of access rules based at least in part on the duration between the request time and the final expiration time for the credential; and determining the access right based at least in part on the selected access rule.

Clause 8: The computer-readable storage media of clauses 5 to 7, wherein determining the access right comprises:

comparing the duration with one or more predetermined intermediate durations relative to the final expiration time, each of the one or more intermediate durations associated with a set of one or more access rules;

selecting, based at least in part on the comparison, a set of access rules associated with one of the one or more intermediate durations; and determining the access right based at least in part on the selected set of access rules.

Clause 9: The computer-readable storage media of clause 8, wherein the one or more intermediate durations includes a first intermediate duration with a first set of access rules and a second intermediate duration with a second set of access rules, the second intermediate duration being shorter than the first intermediate duration and the second set of access rules being more restrictive than the first set of access rules.

Clause 10: The computer-readable storage media of clauses 5 to 9, wherein the access right is determined further based at least in part on one or more characteristics associated with the resource or with the credential.

Clause 11: The computer-readable storage media of clauses 5 to 10, wherein the access right indicates a type, a duration, or a scope of access with respect to the resource.

Clause 12: The computer-readable storage media of clauses 5 to 11, wherein the access right indicates an allowance or denial of access to the resource.

Clause 13: A computer system, comprising:
 a memory that stores computer-executable instructions; and
 a processor configured to access the memory and execute the computer-executable instructions to at least:
  receive, at a request time, a request from a requester to access a plurality of resources using a credential, the request time occurring after an initial expiration time associated with the credential and before a final expiration time;
  determine an access right with a level of a plurality of different access right levels with respect to the resource based at least in part on a duration between the request time and the initial expiration time for the credential, the different access right levels respectively corresponding to different durations between the request time and the initial expiration time for the credential; and
  provide access to the subset of resources for the requester based at least in part on the access right.

Clause 14: The computer system of clause 13, wherein the plurality of resources comprises at least one of a service, a computing device, or a data object.

Clause 15: The computer system of clauses 13 to 14, wherein final expiration time is determined based at least in part on one or more attributes associated with the requester, the credential, or at least one of the plurality of resources.

Cause 16: The computer system of clause 15, wherein determining the access right comprises:
 comparing the duration between the request time and the initial expiration time and one or more intermediate durations relative to the initial expiration time, each of the one or more intermediate durations associated with a set of one or more access rules;
 selecting one of the one or more intermediate durations based on the comparison; and
 determining the access right based at least in part on the set of access rules associated with the selected intermediate durations.

Clause 17: The computer system of clause 16, wherein the one or more intermediate durations are determined based at least in part on one or more attributes associated with at least one of the requester, the credential, or at least one of the plurality of resources.

Clause 18: The computer system of clauses 16 to 17, wherein the one or more intermediate durations includes a first intermediate duration with a first set of access rules and a second intermediate duration with a second set of access rules, the second intermediate duration being longer than the first intermediate duration and the second set of access rules being more restrictive than the first set of access rules.

Clause 19: The computer system of clause 18, wherein the first set of access rules are configured to allow access to a resource that the second set of access rules are configured to prevent access to.

Clause 20: The computer system of clauses 13 to 19, wherein the processor is configured to execute the computer-executable instructions to:
 receiving, from an authentication server, one or more credential properties of the credential; and
 determining the access right based at least in part on the one or more credential properties.

Clause 21: A computer-implemented method, comprising:
 receiving, from a client device, an authentication request message for accessing a server resource, the authentication request message including a credential;
 authenticating the credential to generate an authentication result;
 determining a credential property associated with the credential, the credential property operable for determining an access right with an access right level of a plurality of different access right levels with respect to the resource;
 generating an authorization code comprising the authentication result and the credential property associated with the credential; and
 providing an authentication response message corresponding to the authentication request, the authentication response message comprising the authorization code.

Clause 22: The computer-implemented method of clause 21, wherein the credential property comprises a last updated time of the credential.

Clause 23: The computer-implemented method of clauses 21 to 22, further comprising:
 receiving an authorization request message with respect to a resource, the authorization request message comprising the authorization code;
 extracting the credential property from the authorization code;
 determining an access right with respect to the resource based at least in part on the credential property; and
 providing an authorization response message corresponding to the authorization request message, the authorization response message comprising the access token.

Clause 24: The computer-implemented method of clause 23, wherein determining the access right comprises:
 determining a duration between a request time and an initial expiration time for the credential based at least in part on the credential property; and
 determining the access right with the access right level of the plurality of different access right levels with respect to the resource based at least in part on the duration, the different access right levels respectively corresponding to different durations between the request time and the initial expiration time for the credential.

Clause 25: One or more non-transitory computer-readable storage media storing computer-executable instructions that, when executed by a computing system, configure the computing system to perform operations comprising:
 receiving, from a client device, an authentication request message for accessing a server resource, the authentication request message including a credential; and
 generating an authentication response message corresponding to the authentication request message, the authentication response message including one or more credential properties operable for determining an access right with an access right level of a plurality of different access right levels with respect to the resource.

Clause 26: The computer-readable storage media of clause 25, wherein the one or more credential properties comprise a last updated time, an initial expiration time, or a final expiration time of the credential.

Clause 27: The computer-readable storage media of clauses 25 to 26, wherein the instructions, when executed with the computer system, further cause the computer system to perform operations comprising determining the one or more credential properties based at least in part on one or more instructions from the client device.

Clause 28: The computer-readable storage media of clauses 25 to 27, wherein the instructions, when executed with the computer system, further cause the computer system to perform operations comprising determining an access right with respect to a resource based at least in part on the one or more credential properties.

Clause 29: The computer-readable storage media of clause 28, wherein the determining the access right comprises:
 determining a duration between a request time and an initial expiration time of the credential based at least in part on the one or more credential properties;
 comparing the determined duration and one or more intermediate durations relative to the initial expiration time, each of the one or more intermediate durations associated with a set of one or more access rules;
 selecting one of the one or more intermediate durations based on the comparison; and
 determining the access right based at least in part on the set of access rules associated with the selected intermediate duration.

Clause 30: The computer-readable storage media of clause 29, wherein the one or more intermediate durations includes a first intermediate duration with a first set of access rules and a second intermediate duration with a second set of access rules, the second intermediate duration being longer than the first intermediate duration and the second set of access rules being more restrictive than the first set of access rules.

Clause 31: The computer-readable storage media of clause 30, wherein the first set of access rules are configured to allow access to the resource and the second set of access rules are configured to deny access to the resource.

Clause 32: The computer-readable storage media of clause 30, wherein the first set of access rules are configured to allow read/write access to the resource and the second set of access rules are configured to allow read-only access to the resource.

Clause 33: A computer system, comprising:
 a memory that stores computer-executable instructions; and
 a processor configured to access the memory and execute the computer-executable instructions to at least:
  receive, from a client device, an authorization request message for accessing a resource, the authorization request message comprising an authorization code indicating an authentication of a credential;
  generate an access token for accessing the resource based at least in part on the authentication code and one or more credential properties, the access token indicating an access right with an access right level of a plurality of different access right levels with respect to the resource; and
  provide an authorization response message to the client device comprising the access token.

Clause 34: The computer system of clause 33, wherein the one or more credential properties are obtained from the authorization request message.

Clause 35: The computer system of clause 34, wherein the one or more credential properties are included in the authorization code.

Clause 36: The computer system of clause 33 to 35, wherein the one or more credential properties are obtained from an authentication service that generates the authorization code.

Clause 37: The computer system of clauses 33 to 36, wherein generating the access token comprises:
 determining a duration between a request time and an initial expiration time for the credential based at least in part on the one or more credential properties; and
 determining an access right with an access right level of a plurality of different access right levels with respect to the resource based at least in part on the duration, the different access right levels respectively corresponding to different durations between the request time and the initial expiration time for the credential.

Clause 38: The computer system of clause 37, wherein generating the access token comprises:
 determining a duration between a request time and an initial expiration time for the credential based at least in part on the one or more credential properties;
 comparing the duration and one or more intermediate durations relative to the initial expiration time, each of the one or more intermediate durations associated with a set of one or more access rules;
 selecting one of the one or more intermediate durations based on the comparison; and
 determining the access right based at least in part on the set of access rules associated with the selected intermediate duration.

Clause 39: The computer system of clauses 33 to 38, wherein the one or more intermediate durations includes a first intermediate duration with a first set of access rules and a second intermediate duration with a second set of access rules, the second intermediate duration being longer than the first intermediate duration and the second set of access rules being more restrictive than the first set of access rules.

Clause 40: The computer system of clauses 33 to 39, wherein the credential property comprises a last updated time of the credential.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, at a first access request time, a first access request for accessing a resource using a credential, the first access request time occurring after an initial expiration time associated with the credential and before a final expiration time, the final expiration time determined by adding a predetermined grace period to the initial expiration time;
   selecting a first access rule from a plurality of access rules based at least in part on first durations between the first access request time, the initial expiration time, and the final expiration time;
   determining a first access right with respect to the resource based at least in part on the selected first access rule, the first access right configured to be more restrictive than an access granted prior to the initial expiration time;
   generating a first access response corresponding to the first access request based at least in part on the first access right;
   receiving, at a second access request time, a second request for accessing the resource using the credential, the second access request time occurring after the first access request time and before the final expiration time;
   selecting a second access rule from the plurality of access rules based at least in part on second durations between the second access request time, the initial expiration time, and the final expiration time;
   determining a second access right with respect to the resource based at least in part on the selected second access rule, historical access data associated with aggregated user behavior for selected previous access to the resource, and one or more attributes associated with sensor data indicating security breaches at the resource, the second access right being more restrictive than the first access right; and
   generating a second access response corresponding to the second access request based at least in part on the second access right.

2. The computer-implemented method of claim 1, wherein the first access right is configured to allow access to the resource and the second access right is configured to deny access to the resource.

3. The computer-implemented method of claim 1, wherein the first access right is configured to allow read/write access to the resource and the second access right is configured to allow read-only access to the resource.

4. The computer-implemented method of claim 1, wherein the credential includes at least one of a password, a cryptographic key, or a digital certificate.

5. One or more non-transitory computer-readable storage media storing computer-executable instructions that, when executed by a computing system, configure the computing system to perform operations comprising:
   in response to receiving, at a request time, a request to access a resource using a credential, the request time occurring after an initial expiration time associated with the credential and before a final expiration time:
     selecting a first access rule from a plurality of access rules based at least in part on first durations between the request time, the initial expiration time, and the final expiration time;
     determining an access right with a level of a plurality of different access right levels with respect to the resource based at least in part on the selected first access rule, historical access data associated with aggregated user behavior for selected previous access to the resource, and one or more attributes associated with sensor data indicating security breaches at the resource, the different access right levels respectively corresponding to different durations between the request time and the final expiration time for the credential; and
     providing a level of access to the resource based at least in part on the level of determined access right.

6. The computer-readable storage media of claim 5, wherein the access right is determined based at least in part on a second duration between the request time and the initial expiration time.

7. The computer-readable storage media of claim 5, wherein determining the access right comprises:
   selecting a second access rule from the plurality of access rules based at least in part on a duration between the request time and the final expiration time for the credential; and
   determining the access right based at least in part on the selected second access rule.

8. The computer-readable storage media of claim 7, wherein determining the access right comprises:
   comparing the duration with one or more predetermined intermediate durations relative to the final expiration time, each of the one or more intermediate durations associated with a set of one or more access rules of the plurality of access rules;
   selecting, based at least in part on the comparison, the set of access rules associated with one of the one or more intermediate durations; and
   determining the access right based at least in part on the selected set of access rules.

9. The computer-readable storage media of claim 8, wherein the one or more intermediate durations includes a first intermediate duration with a first set of access rules and a second intermediate duration with a second set of access rules, the second intermediate duration being shorter than the first intermediate duration and the second set of access rules being more restrictive than the first set of access rules.

10. The computer-readable storage media of claim 5, wherein the access right is determined further based at least in part on one or more characteristics associated with the resource or with the credential.

11. The computer-readable storage media of claim 5, wherein the access right indicates a type, a duration, or a scope of access with respect to the resource.

12. The computer-readable storage media of claim 5, wherein the access right indicates an allowance or denial of access to the resource.

13. A computer system, comprising:
a memory that stores computer-executable instructions; and
a processor configured to access the memory and execute the computer-executable instructions to at least:
receive, at a request time, a request from a requester to access a plurality of resources using a credential, the request time occurring after an initial expiration time associated with the credential and before a final expiration time;
select a first access rule from a plurality of access rules based at least in part on first durations between the request time, the initial expiration time, and the final expiration time;
determine an access right with a level of a plurality of different access right levels with respect to a resource of the plurality of resources based at least in part on the selected first access rule, historical access data associated with aggregated user behavior for selected previous access to the resource, and one or more attributes associated with sensor data indicating security breaches at the resource, the different access right levels respectively corresponding to different durations between the request time and the initial expiration time for the credential; and
provide access to the subset of resources for the requester based at least in part on the access right.

14. The computer system of claim 13, wherein the plurality of resources comprises at least one of a service, a computing device, or a data object.

15. The computer system of claim 13, wherein the one or more attributes include attributes associated with the requestor, the credential, or at least one of the plurality of resources and wherein final expiration time is determined based at least in part on the one or more attributes.

16. The computer system of claim 15, wherein determining the access right comprises:
comparing the duration between the request time and the initial expiration time and one or more intermediate durations relative to the initial expiration time, each of the one or more intermediate durations associated with a set of one or more access rules of the plurality of access rules;
selecting one of the one or more intermediate durations based on the comparison; and
determining the access right based at least in part on the set of access rules associated with the selected intermediate durations.

17. The computer system of claim 16, wherein the one or more intermediate durations are determined based at least in part on the attributes associated with at least one of the requester, the credential, or at least one of the plurality of resources.

18. The computer system of claim 16, wherein the one or more intermediate durations includes a first intermediate duration with a first set of access rules and a second intermediate duration with a second set of access rules, the second intermediate duration being longer than the first intermediate duration and the second set of access rules being more restrictive than the first set of access rules.

19. The computer system of claim 18, wherein the first set of access rules are configured to allow access to the resource that the second set of access rules are configured to prevent access to.

20. The computer system of claim 13, wherein the processor is configured to execute the computer-executable instructions to:
receiving, from an authentication server, one or more credential properties of the credential; and
determining the access right based at least in part on the one or more credential properties.

* * * * *